US011962437B2

(12) United States Patent
Omer et al.

(10) Patent No.: US 11,962,437 B2
(45) Date of Patent: Apr. 16, 2024

(54) FILTERING CHANNEL RESPONSES FOR MOTION DETECTION

(71) Applicant: Cognitive Systems Corp., Waterloo (CA)

(72) Inventors: Mohammad Omer, Waterloo (CA); Mikhail Alexand Zakharov, Guelph (CA)

(73) Assignee: Cognitive Systems Corp., Waterloo (CA)

( * ) Notice: Subject to any disclaimer, the term of this patent is extended or adjusted under 35 U.S.C. 154(b) by 0 days.

(21) Appl. No.: 17/379,647

(22) Filed: Jul. 19, 2021

(65) Prior Publication Data

US 2022/0173939 A1 Jun. 2, 2022

Related U.S. Application Data

(63) Continuation of application No. 17/106,989, filed on Nov. 30, 2020, now Pat. No. 11,070,399.

(51) Int. Cl.
*H04L 25/02* (2006.01)
*G01S 5/00* (2006.01)
(Continued)

(52) U.S. Cl.
CPC ............ *H04L 25/022* (2013.01); *G01S 5/011* (2020.05); *G01S 5/017* (2020.05); *G01S 5/0273* (2013.01);
(Continued)

(58) Field of Classification Search
CPC . H04L 5/0048; H04L 25/0204; H04L 25/022; H04L 25/0224; H04L 25/03159;
(Continued)

(56) References Cited

U.S. PATENT DOCUMENTS 4,054,879 A 10/1977 Wright et al.
4,636,774 A 1/1987 Galvin et al.
(Continued)

FOREIGN PATENT DOCUMENTS

CA 2834522 5/2014
CA 2945702 8/2015
(Continued)

OTHER PUBLICATIONS

USPTO, Notice of Allowance dated Mar. 19, 2021, in U.S. Appl. No. 17/106,989, 35 pgs.
(Continued)

*Primary Examiner* — David B Lugo
(74) *Attorney, Agent, or Firm* — Henry Patent Law Firm PLLC

(57) ABSTRACT

In a general aspect, a set of observed frequency-domain channel responses is filtered to remove noise or distortions that are not related to changes in the physical environment. In some aspects, for each frequency-domain channel response, a time-domain channel response is generated based on the frequency-domain channel response; and a filtered time-domain channel response is generated based on a constraint applied to the time-domain channel response. Additionally, a reconstructed frequency-domain channel response is generated based on the filtered time-domain channel response. An error signal is also generated, and a determination is made as to whether the error signal satisfies a criterion. The error signal can be indicative of a difference between the frequency-domain channel response and the reconstructed frequency-domain channel response. In response to each of the error signals satisfying the criterion, motion of an object in a space is detected based on the set of frequency-domain channel responses.

20 Claims, 14 Drawing Sheets

(51) Int. Cl.
*G01S 5/02* (2010.01)
*G01S 7/41* (2006.01)
*G01S 13/04* (2006.01)
*G01S 13/50* (2006.01)
*H04L 5/00* (2006.01)
*H04L 25/03* (2006.01)

(52) U.S. Cl.
CPC .............. *G01S 7/415* (2013.01); *G01S 13/04* (2013.01); *G01S 13/50* (2013.01); *H04L 5/0048* (2013.01); *H04L 25/0204* (2013.01); *H04L 25/03159* (2013.01); *H04L 25/0224* (2013.01)

(58) Field of Classification Search
CPC ........ G01S 5/011; G01S 5/017; G01S 5/0273; G01S 7/415; G01S 13/04; G01S 13/50
See application file for complete search history.

(56) References Cited

U.S. PATENT DOCUMENTS

| | | |
|---|---|---|
| 4,649,388 A | 3/1987 | Atlas |
| 4,740,045 A | 4/1988 | Goodson et al. |
| 5,270,720 A | 12/1993 | Stove |
| 5,613,039 A | 3/1997 | Wang et al. |
| 5,696,514 A | 12/1997 | Nathanson et al. |
| 6,075,797 A | 6/2000 | Thomas |
| 6,380,882 B1 | 4/2002 | Hegnauer |
| 6,573,861 B1 | 6/2003 | Hommel et al. |
| 6,636,763 B1 | 10/2003 | Junker et al. |
| 6,914,854 B1 | 7/2005 | Heberley et al. |
| 7,652,617 B2 | 1/2010 | Kurtz et al. |
| 7,742,753 B2 | 6/2010 | Carrero et al. |
| 8,463,191 B2 | 6/2013 | Farajidana et al. |
| 8,660,578 B1 | 2/2014 | Yang et al. |
| 8,671,069 B2 | 3/2014 | Chang et al. |
| 8,710,984 B2 | 4/2014 | Wilson et al. |
| 8,760,392 B2 | 6/2014 | Lloyd et al. |
| 8,812,654 B2 | 8/2014 | Gelvin et al. |
| 8,832,244 B2 | 9/2014 | Gelvin et al. |
| 8,836,344 B2 | 9/2014 | Habib et al. |
| 8,836,503 B2 | 9/2014 | Gelvin et al. |
| 8,934,884 B2 | 1/2015 | Gustafsson et al. |
| 9,019,148 B1 | 4/2015 | Bikhazi et al. |
| 9,030,321 B2 | 5/2015 | Breed |
| 9,161,172 B2 | 10/2015 | Poduri et al. |
| 9,253,592 B1 | 2/2016 | Moscovich et al. |
| 9,329,701 B2 | 5/2016 | Lautner |
| 9,389,085 B2 | 7/2016 | Khorashadi et al. |
| 9,523,760 B1 | 12/2016 | Kravets et al. |
| 9,524,628 B1 | 12/2016 | Omer et al. |
| 9,551,784 B2 | 1/2017 | Katuri et al. |
| 9,584,974 B1 | 2/2017 | Omer et al. |
| 9,609,468 B1 | 3/2017 | Moscovich et al. |
| 9,628,365 B2 | 4/2017 | Gelvin et al. |
| 9,692,459 B2 | 6/2017 | Maltsev et al. |
| 9,743,294 B1 | 8/2017 | Omer et al. |
| 9,866,308 B1 | 1/2018 | Bultan et al. |
| 9,869,759 B2 | 1/2018 | Furuskog et al. |
| 9,927,519 B1 | 3/2018 | Omer et al. |
| 9,933,517 B1 | 4/2018 | Olekas et al. |
| 9,946,351 B2 | 4/2018 | Sakaguchi et al. |
| 9,989,622 B1 | 6/2018 | Griesdorf et al. |
| 10,004,076 B1 | 6/2018 | Griesdorf et al. |
| 10,048,350 B1 | 8/2018 | Piao et al. |
| 10,051,414 B1 | 8/2018 | Omer et al. |
| 10,077,204 B2 | 9/2018 | Maschmeyer et al. |
| 10,108,903 B1 | 10/2018 | Piao et al. |
| 10,109,167 B1 | 10/2018 | Olekas et al. |
| 10,109,168 B1 | 10/2018 | Devison et al. |
| 10,111,228 B2 | 10/2018 | Griesdorf et al. |
| 10,129,853 B2 | 11/2018 | Manku et al. |
| 10,228,439 B1 | 3/2019 | Olekas et al. |
| 10,264,405 B1 | 4/2019 | Manku et al. |
| 10,318,890 B1 | 6/2019 | Kravets et al. |
| 10,380,856 B2 | 8/2019 | Devison et al. |
| 10,393,866 B1 | 8/2019 | Kravets et al. |
| 10,404,387 B1 | 9/2019 | Devison et al. |
| 10,438,468 B2 | 10/2019 | Olekas et al. |
| 10,459,074 B1 | 10/2019 | Omer et al. |
| 10,459,076 B2 | 10/2019 | Kravets et al. |
| 10,460,581 B1 | 10/2019 | Devison et al. |
| 10,498,467 B1 | 12/2019 | Ravkine |
| 10,499,364 B1 | 12/2019 | Ravkine |
| 10,506,384 B1 | 12/2019 | Omer et al. |
| 10,565,860 B1 | 2/2020 | Omer et al. |
| 10,567,914 B1 | 2/2020 | Omer et al. |
| 10,600,314 B1 | 3/2020 | Manku et al. |
| 10,605,907 B2 | 3/2020 | Kravets et al. |
| 10,605,908 B2 | 3/2020 | Kravets et al. |
| 10,743,143 B1 | 8/2020 | Devison et al. |
| 10,849,006 B1 | 11/2020 | Beg et al. |
| 11,070,399 B1 | 7/2021 | Omer et al. |
| 2002/0080014 A1 | 6/2002 | McCarthy et al. |
| 2003/0108119 A1 | 6/2003 | Mohebbi et al. |
| 2005/0105659 A1* | 5/2005 | Sheu .................... H04L 27/2662 375/360 |
| 2005/0128067 A1 | 6/2005 | Zakrewski |
| 2006/0152404 A1 | 7/2006 | Fullerton et al. |
| 2006/0217132 A1 | 9/2006 | Drummond-Murray et al. |
| 2006/0284757 A1 | 12/2006 | Zemany |
| 2007/0036353 A1 | 2/2007 | Reznik et al. |
| 2007/0147489 A1* | 6/2007 | Sun .................... H04L 25/03057 375/233 |
| 2007/0280366 A1* | 12/2007 | Aytur .................... H04L 25/0228 375/260 |
| 2007/0296571 A1 | 12/2007 | Kolen |
| 2008/0057978 A1 | 3/2008 | Karaoguz et al. |
| 2008/0119130 A1 | 5/2008 | Sinha |
| 2008/0240008 A1 | 10/2008 | Backes et al. |
| 2008/0258907 A1 | 10/2008 | Kalpaxis |
| 2008/0300055 A1 | 12/2008 | Lutnick et al. |
| 2008/0303655 A1 | 12/2008 | Johnson |
| 2009/0062696 A1 | 3/2009 | Nathan et al. |
| 2009/0180444 A1 | 7/2009 | McManus et al. |
| 2010/0073686 A1 | 3/2010 | Medeiros et al. |
| 2010/0127853 A1 | 5/2010 | Hanson et al. |
| 2010/0130229 A1 | 5/2010 | Sridhara et al. |
| 2010/0207804 A1 | 8/2010 | Hayward et al. |
| 2010/0220767 A1* | 9/2010 | Berens .................... H04L 5/0007 375/135 |
| 2010/0234045 A1 | 9/2010 | Karr et al. |
| 2010/0306320 A1 | 12/2010 | Leppanen et al. |
| 2010/0315284 A1 | 12/2010 | Trizna et al. |
| 2011/0019587 A1 | 1/2011 | Wang |
| 2011/0035491 A1 | 2/2011 | Gelvin et al. |
| 2011/0090081 A1 | 4/2011 | Khorashadi et al. |
| 2011/0148689 A1 | 6/2011 | Filippi et al. |
| 2011/0260856 A1 | 10/2011 | Rossmann et al. |
| 2011/0260871 A1 | 10/2011 | Karkowski |
| 2011/0263946 A1 | 10/2011 | El Kaliouby et al. |
| 2012/0115512 A1 | 5/2012 | Grainger et al. |
| 2012/0146788 A1 | 6/2012 | Wilson et al. |
| 2012/0182429 A1 | 7/2012 | Forutanpour et al. |
| 2012/0184296 A1 | 7/2012 | Milosiu |
| 2012/0283896 A1 | 11/2012 | Persaud |
| 2013/0017836 A1 | 1/2013 | Chang et al. |
| 2013/0045759 A1 | 2/2013 | Smith |
| 2013/0090151 A1 | 4/2013 | Ngai et al. |
| 2013/0094538 A1 | 4/2013 | Wang |
| 2013/0113647 A1 | 5/2013 | Sentelle et al. |
| 2013/0162459 A1 | 6/2013 | Aharony et al. |
| 2013/0178231 A1 | 7/2013 | Morgan |
| 2013/0283256 A1 | 10/2013 | Proud |
| 2014/0015706 A1 | 1/2014 | Ishihara et al. |
| 2014/0073346 A1 | 3/2014 | Yang et al. |
| 2014/0126323 A1 | 5/2014 | Li et al. |
| 2014/0135042 A1 | 5/2014 | Buchheim et al. |
| 2014/0148195 A1 | 5/2014 | Bassan-Eskenazi et al. |
| 2014/0213284 A1 | 7/2014 | Yang et al. |
| 2014/0247179 A1 | 9/2014 | Furuskog |
| 2014/0266669 A1 | 9/2014 | Fadell et al. |
| 2014/0274218 A1 | 9/2014 | Kadiwala et al. |

(56) References Cited

U.S. PATENT DOCUMENTS

| | | |
|---|---|---|
| 2014/0286380 A1 | 9/2014 | Prager et al. |
| 2014/0288876 A1 | 9/2014 | Donaldson |
| 2014/0329540 A1 | 11/2014 | Duggan et al. |
| 2014/0355713 A1 | 12/2014 | Bao et al. |
| 2014/0358473 A1 | 12/2014 | Goel et al. |
| 2014/0361920 A1 | 12/2014 | Katuri et al. |
| 2015/0043377 A1 | 2/2015 | Cholas et al. |
| 2015/0049701 A1 | 2/2015 | Tian et al. |
| 2015/0063323 A1 | 3/2015 | Sadek et al. |
| 2015/0078295 A1 | 3/2015 | Mandyam et al. |
| 2015/0098377 A1 | 4/2015 | Amini et al. |
| 2015/0159100 A1 | 6/2015 | Shi et al. |
| 2015/0181388 A1 | 6/2015 | Smith |
| 2015/0195100 A1 | 7/2015 | Imes et al. |
| 2015/0212205 A1 | 7/2015 | Shpater |
| 2015/0245164 A1 | 8/2015 | Merrill |
| 2015/0269825 A1 | 9/2015 | Tran |
| 2015/0288745 A1 | 10/2015 | Moghaddam et al. |
| 2015/0304886 A1 | 10/2015 | Liu et al. |
| 2015/0309166 A1 | 10/2015 | Sentelle et al. |
| 2015/0312877 A1 | 10/2015 | Bhanage |
| 2015/0338507 A1 | 11/2015 | Oh et al. |
| 2015/0350849 A1 | 12/2015 | Huang et al. |
| 2015/0366542 A1 | 12/2015 | Brown et al. |
| 2016/0014554 A1 | 1/2016 | Sen et al. |
| 2016/0018508 A1 | 1/2016 | Chen et al. |
| 2016/0080908 A1 | 3/2016 | Julian et al. |
| 2016/0088438 A1 | 3/2016 | O'Keeffe |
| 2016/0088631 A1 | 3/2016 | Hedayat et al. |
| 2016/0135205 A1 | 5/2016 | Barbu et al. |
| 2016/0150418 A1 | 5/2016 | Kang et al. |
| 2016/0178741 A1 | 6/2016 | Ludlow et al. |
| 2016/0183059 A1 | 6/2016 | Nagy et al. |
| 2016/0187475 A1 | 6/2016 | Horng et al. |
| 2016/0203689 A1 | 7/2016 | Hintz et al. |
| 2016/0210838 A1 | 7/2016 | Yan et al. |
| 2016/0217683 A1 | 7/2016 | Li |
| 2016/0262355 A1 | 9/2016 | Swan |
| 2016/0363663 A1 | 12/2016 | Mindell et al. |
| 2016/0365913 A1* | 12/2016 | Lau ................ H04L 5/0048 |
| 2017/0042488 A1 | 2/2017 | Muhsin |
| 2017/0052247 A1 | 2/2017 | Kong et al. |
| 2017/0055126 A1 | 2/2017 | O'Keeffe |
| 2017/0055131 A1 | 2/2017 | Kong et al. |
| 2017/0059190 A1 | 3/2017 | Stefanski et al. |
| 2017/0086281 A1 | 3/2017 | Avrahamy |
| 2017/0090026 A1 | 3/2017 | Joshi et al. |
| 2017/0111852 A1 | 4/2017 | Selen et al. |
| 2017/0123528 A1 | 5/2017 | Hu et al. |
| 2017/0126488 A1 | 5/2017 | Cordeiro et al. |
| 2017/0146656 A1 | 5/2017 | Belsley et al. |
| 2017/0150255 A1 | 5/2017 | Wang et al. |
| 2017/0155439 A1 | 6/2017 | Chang et al. |
| 2017/0177618 A1 | 6/2017 | Hu et al. |
| 2017/0180882 A1 | 6/2017 | Lunner et al. |
| 2017/0195893 A1 | 7/2017 | Lee et al. |
| 2017/0223628 A1 | 8/2017 | Snyder et al. |
| 2017/0251392 A1 | 8/2017 | Nabetani |
| 2017/0278374 A1 | 9/2017 | Skaaksrud |
| 2017/0280351 A1 | 9/2017 | Skaaksrud |
| 2017/0311279 A1 | 10/2017 | Allegue Martinez et al. |
| 2017/0311574 A1 | 11/2017 | Swan |
| 2017/0343658 A1 | 11/2017 | Ramirez et al. |
| 2017/0359804 A1 | 12/2017 | Manku et al. |
| 2018/0027389 A1 | 1/2018 | Shirakata et al. |
| 2018/0086264 A1 | 3/2018 | Pedersen |
| 2018/0106885 A1 | 4/2018 | Blayvas |
| 2018/0120420 A1 | 5/2018 | McMahon et al. |
| 2018/0168552 A1 | 6/2018 | Shi et al. |
| 2018/0180706 A1 | 6/2018 | Li et al. |
| 2018/0184907 A1 | 7/2018 | Tran |
| 2018/0270821 A1 | 9/2018 | Griesdorf et al. |
| 2018/0288587 A1 | 10/2018 | Allegue Martinez et al. |
| 2018/0330293 A1 | 11/2018 | Kulkarni et al. |
| 2019/0033446 A1 | 1/2019 | Bultan et al. |
| 2019/0122514 A1 | 4/2019 | Olekas et al. |
| 2019/0146075 A1 | 5/2019 | Kravets et al. |
| 2019/0146076 A1 | 5/2019 | Kravets et al. |
| 2019/0146077 A1 | 5/2019 | Kravets et al. |
| 2019/0147713 A1 | 5/2019 | Devison et al. |
| 2019/0156943 A1 | 5/2019 | Kocherscheidt et al. |
| 2019/0170869 A1 | 6/2019 | Kravets et al. |
| 2019/0272718 A1 | 9/2019 | Hurtig et al. |
| 2019/0294833 A1 | 9/2019 | Lu et al. |
| 2019/0327124 A1 | 10/2019 | Lai et al. |
| 2019/0379434 A1 | 12/2019 | Lindskog et al. |
| 2020/0145072 A1* | 5/2020 | Dash ................ H04B 7/0617 |
| 2020/0175405 A1 | 6/2020 | Omer et al. |
| 2020/0178033 A1 | 6/2020 | Omer et al. |
| 2020/0264292 A1 | 8/2020 | Kravets et al. |
| 2020/0351576 A1 | 11/2020 | Beg et al. |
| 2020/0351692 A1 | 11/2020 | Beg et al. |
| 2021/0063537 A1 | 3/2021 | Martinez et al. |

FOREIGN PATENT DOCUMENTS

| | | |
|---|---|---|
| CN | 108957399 | 12/2018 |
| CN | 111373281 | 7/2020 |
| JP | 1997-507298 | 7/1997 |
| JP | 2004286567 | 10/2004 |
| JP | 2013072865 | 4/2013 |
| JP | 6776374 | 10/2020 |
| WO | 2014021574 | 2/2014 |
| WO | 2014201574 | 12/2014 |
| WO | 2015168700 | 11/2015 |
| WO | 2016005977 | 1/2016 |
| WO | 2016066822 | 5/2016 |
| WO | 2016110844 | 7/2016 |
| WO | 2017106976 | 6/2017 |
| WO | 2017132765 | 8/2017 |
| WO | 2017177303 | 10/2017 |
| WO | 2017210770 | 12/2017 |
| WO | 2018071456 | 4/2018 |
| WO | 2018094502 | 5/2018 |
| WO | 2019041019 | 3/2019 |
| WO | 2019075551 | 4/2019 |
| WO | 2020150806 | 7/2020 |
| WO | 2020150807 | 7/2020 |
| WO | 2020227804 | 11/2020 |
| WO | 2020227805 | 11/2020 |
| WO | 2020227806 | 11/2020 |

OTHER PUBLICATIONS

Banerjee , et al., "Through Wall People Localization Exploiting Radio Windows", arXiv: 1307.7233v1, Jul. 27, 2013, 14 pgs.

Cai , et al., "Human Movement Detection in Wi-Fi Mesh Networks", Technical Disclosure Commons, Dec. 17, 2017, 8 pgs.

Dekker , et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.

Domenico , et al., "Exploring Training Options for RF Sensing Using CSI", IEEE Communications Magazine, 2018, vol. 56, Issue 5, pp. 116-123, 8 pgs.

Iqbal , et al., "Indoor Motion Classification Using Passive RF Sensing Incorporating Deep Learning", ISSN: 2577-2465, Electronic IEEE, Jun. 3, 2018, 5 pgs.

Kosba , et al., "Robust WLAN Device-free Passive Motion Detection", IEEE Wireless Communications and Networking Conference, Apr. 2012, 6 pgs.

Krumm , et al., "Locadio: Inferring Motion and Location from Wi-Fi Signal Strengths", First Annual Int'l Conference on Mobile and Ubiquitous Systems: Networking and Services, Boston, MA, Aug. 22, 2004, 10 pgs.

Lai , "This mesh WiFi router can track motion to protect your family", https://www.engadget.com/2018-06-06-origin-wireless-wifi-mesh-motion-fall-sleep-detection.htm., Jun. 16, 2018, 6 pgs.

(56) References Cited

OTHER PUBLICATIONS

Youssef, Moustafa, et al., "Challenges: Device-free Passive Localization for Wireless Environments", Mobicom 07 Proceedings of the 13th Annual ACM International Conference on Mobile Computing and Networking, Sep. 2007, 11 pgs.

Youssef, et al., "Challenges: Device-free Passive Localization for Wireless Environments", Proceedings of the 13th Annual ACM Int'l Conference on Mobile Computing and Networking, Montreal, Canada, Sep. 9, 2007, 8 pgs.

WIPO, International Search Report and Written Opinion dated Aug. 2, 2021, in PCT/CA2021/050560, 8 pgs.

\* cited by examiner

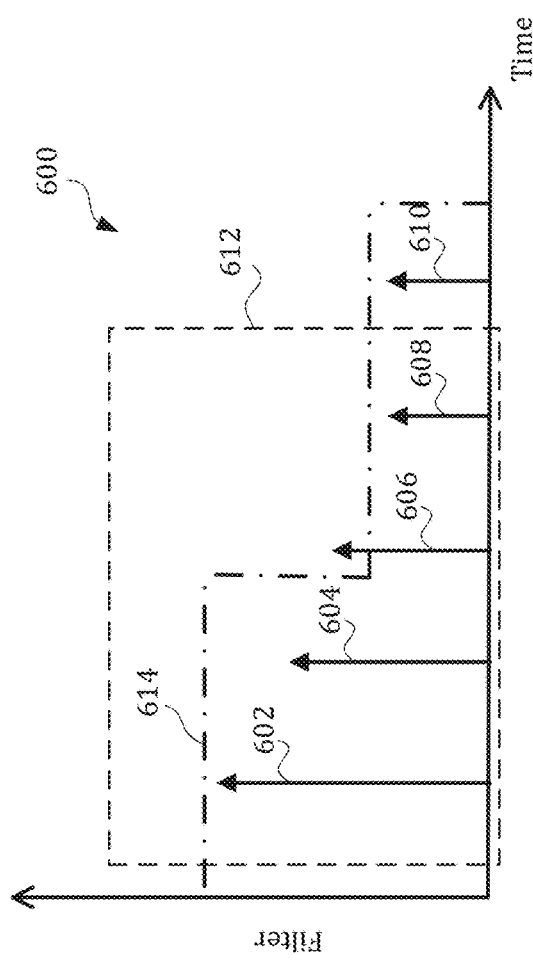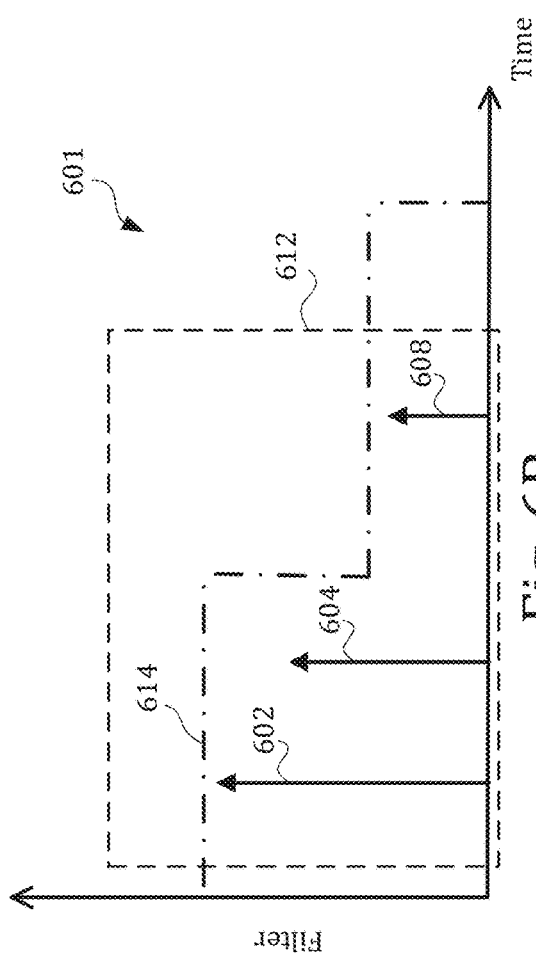

FILTERING CHANNEL RESPONSES FOR MOTION DETECTION

CROSS-REFERENCE TO RELATED APPLICATIONS

This application is a continuation of U.S. patent application Ser. No. 17/106,989, filed Nov. 30, 2020, and entitled "Filtering Channel Responses for Motion Detection," the disclosure of which is hereby incorporated by reference.

BACKGROUND

The following description relates to filtering channel responses for motion detection.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems, and other types of systems.

DESCRIPTION OF DRAWINGS

FIG. 6A is a plot showing an example time-domain channel response $h_i(t)$ obtained from an observed frequency-domain channel response $H_i(f)$.

FIG. 6B is a plot showing an example filtered time-domain channel response $\hat{h}_i(t)$ obtained from a first iteration of the example signal processing system shown in FIG. 5.

DETAILED DESCRIPTION

Figure 1:
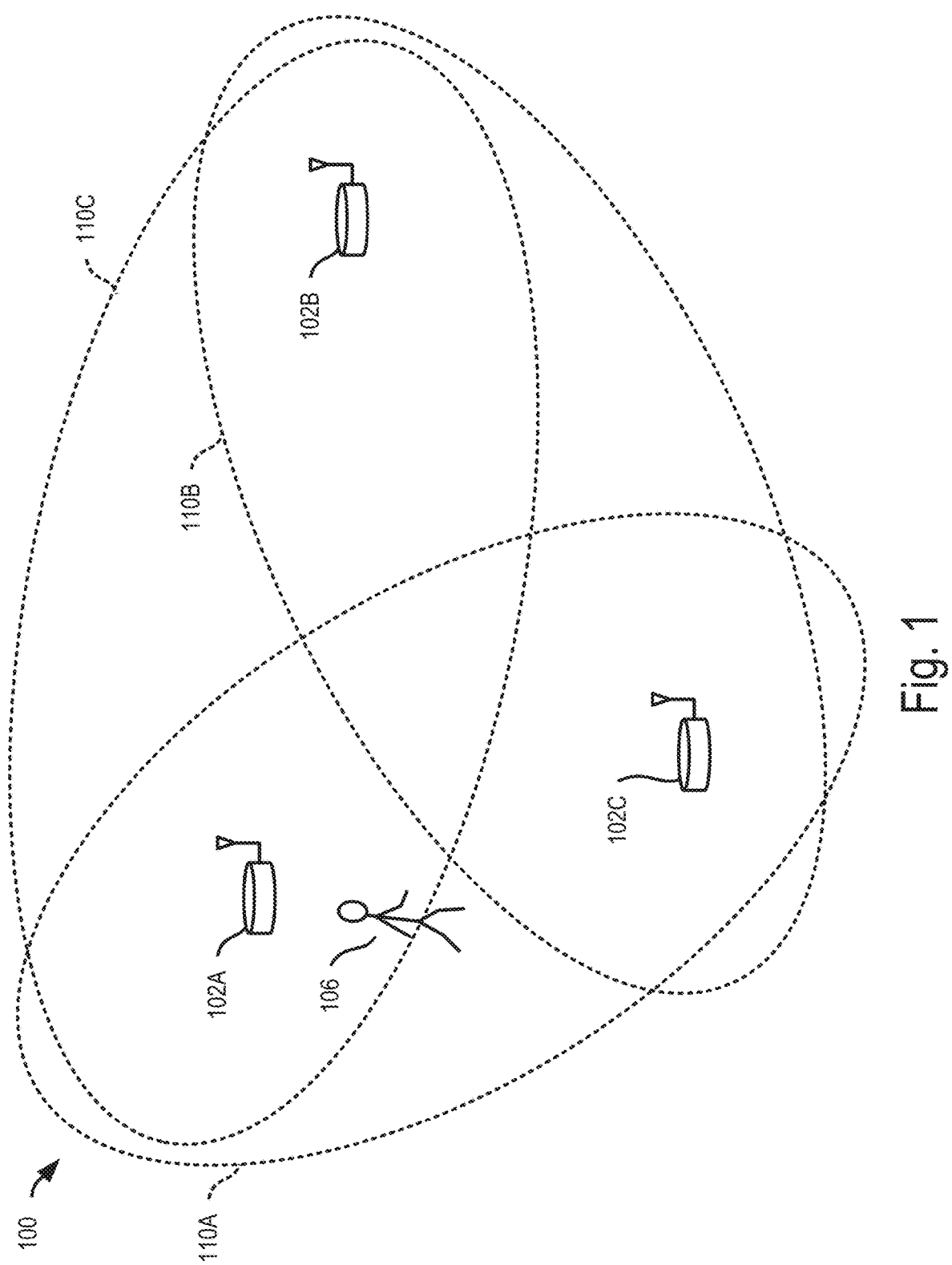
FIG. 1 is a diagram showing an example wireless communication system.

In some aspects of what is described here, a wireless sensing system can process wireless signals (e.g., radio frequency signals) transmitted through a space between wireless communication devices for wireless sensing applications. Example wireless sensing applications include detecting motion, which can include one or more of the following: detecting motion of objects in the space, motion tracking, localization of motion in a space, breathing detection, breathing monitoring, presence detection, gesture detection, gesture recognition, human detection (e.g., moving and stationary human detection), human tracking, fall detection, speed estimation, intrusion detection, walking detection, step counting, respiration rate detection, sleep pattern detection, sleep quality monitoring, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. Other examples of wireless sensing applications include object recognition, speaking recognition, keystroke detection and recognition, tamper detection, touch detection, attack detection, user authentication, driver fatigue detection, traffic monitoring, smoking detection, school violence detection, human counting, metal detection, human recognition, bike localization, human queue estimation, Wi-Fi imaging, and other types of wireless sensing applications. For instance, the wireless sensing system may operate as a motion detection system to detect the existence and location of motion based on Wi-Fi signals or other types of wireless signals.

The examples described herein may be useful for home monitoring. In some instances, home monitoring using the wireless sensing systems described herein may provide several advantages, including full home coverage through walls and in darkness, discreet detection without cameras, higher accuracy and reduced false alerts (e.g., in comparison with sensors that do not use Wi-Fi signals to sense their environments), and adjustable sensitivity. By layering Wi-Fi motion detection capabilities into routers and gateways, a robust motion detection system may be provided.

The examples described herein may also be useful for wellness monitoring. Caregivers want to know their loved ones are safe, while seniors and people with special needs want to maintain their independence at home with dignity. Wellness monitoring using the wireless sensing systems described herein provide a solution that uses wireless signals to detect motion without using cameras or infringing on privacy, generates alerts when unusual activity is detected, tracks sleep patterns, and generates preventative health data. For example, caregivers can monitor motion, visits from health care professionals, and unusual behavior such as staying in bed longer than normal. Furthermore, motion is monitored unobtrusively without the need for wearable devices, and the wireless sensing systems described herein offer a more affordable and convenient alternative to assisted living facilities and other security and health monitoring tools.

The examples described herein may also be useful for setting up a smart home. In some examples, the wireless sensing systems described herein use predictive analytics and artificial intelligence (AI), to learn motion patterns and trigger smart home functions accordingly. Examples of smart home functions that may be triggered include adjusting the thermostat when a person walks through the front door, turning other smart devices on or off based on preferences, automatically adjusting lighting, adjusting HVAC systems based on present occupants, etc.

In some aspects of what is described here, a set of observed channel responses are obtained based on a set of wireless signals transmitted through a space (or propagation environment). Each of the wireless signals in the set of wireless signals that is transmitted in the environment may be an orthogonal frequency division multiplexing (OFDM) signal, which can include, for example, a PHY frame. The PHY frame can, in some instances, include one or more Legacy PHY fields, one or more MIMO training fields, or both. Example Legacy PHY fields include a Legacy Long Training Field (L-LTF), a Legacy Short Training Field (L-STF), and other types of Legacy PHY fields. Example MIMO training fields include a High Efficiency Long Training Field (HE-LTF), a Very High-Throughput Long Training Field (VHT-LTF), a High-Throughput Long Training Field (HT-LTF), and other types of MIMO training fields. The fields in the PHY frames of the wireless signals in the set of wireless signals can be used to obtain the set of observed channel responses. In some instances, the set of observed channel response includes frequency-domain channel responses, and each frequency-domain channel response in the set of frequency-domain channel responses may correspond to a respective wireless signal in the set of wireless signals.

Motion of an object in the space can cause a change in one or more of the frequency-domain channel responses, and changes observed in the set of frequency-domain channel responses can be used to detect motion of an object within the space. In some instances, changes in the set of frequency-domain channel responses can be caused by device- or system-level impairments (e.g., noise or distortions) that are not related to changes in the physical environment (e.g., motion of an object in the space). For example, electronic impairments on the device-level or the system-level (or both) may cause a change in the set of frequency-domain channel responses. Therefore, impairments that are not related to changes in the physical environment (e.g., motion) can corrupt the set of frequency-domain channel responses. Consequently, motion detection errors (e.g., one or more false positives) can occur when motion of an object in the space is detected using the corrupted set of frequency-domain channel responses.

In some aspects of what is described here, each frequency-domain channel response from the set of observed frequency-domain channel responses is processed to filter out noise or distortions that are not related to changes in the physical environment. A result of the filtering operation is a set of reconstructed frequency-domain channel responses. In some aspects of what is described here, the filtering operation also generates a set of quality metrics, and each quality metric corresponds to a respective reconstructed frequency-domain channel response and a respective observed frequency-domain channel response. In some instances, the quality metric may be a measure of an extent to which the respective observed frequency-domain channel response has been corrupted by impairments that are not related to changes in the physical environment. Therefore, the quality metric may be analogous to a signal-to-noise ratio (SNR) of the corresponding frequency-domain channel response. In some aspects of what is described here, motion is detected based on the set of observed frequency-domain channel responses. For example, motion can be detected by detecting changes in the set of reconstructed frequency-domain channel responses. In another example, motion can be detected by detecting changes in the set of observed frequency-domain channel responses when each of the quality metrics are greater than a predetermined threshold.

In some instances, aspects of the systems and techniques described here provide technical improvements and advantages over existing approaches. The systems and techniques described here can be used to increase the accuracy of a motion detection system. For example, the false positive rate of a motion detection system can be reduced by filtering out the effects of device- or system-level electronic impairments on the observed frequency-domain channel responses and by taking the quality metrics into account when detecting motion. The technical improvements and advantages achieved in examples where the wireless sensing system is used for motion detection may also be achieved in other examples where the wireless sensing system is used for other wireless sensing applications.

In some instances, a wireless sensing system can be implemented using a wireless communication network. Wireless signals received at one or more wireless communication devices in the wireless communication network may be analyzed to determine channel information for the different communication links (between respective pairs of wireless communication devices) in the network. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information (CSI), etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at particular angles experience constructive interference while others experience destructive interference.

The channel information for each of the communication links may be analyzed by one or more motion detection algorithms (e.g., running on a hub device, a client device, or other device in the wireless communication network, or on a remote device communicably coupled to the network) to detect, for example, whether motion has occurred in the space, to determine a relative location of the detected motion, or both. In some aspects, the channel information for each of the communication links may be analyzed to detect whether an object is present or absent, e.g., when no motion is detected in the space.

In some instances, a motion detection system returns motion data. In some implementations, motion data is a result that is indicative of a degree of motion in the space, the location of motion in the space, a time at which the motion occurred, or a combination thereof. In some instances, the motion data can include a motion score, which may include, or may be, one or more of the following: a scalar quantity indicative of a level of signal perturbation in the environment accessed by the wireless signals; an indication of whether there is motion; an indication of whether there is an object present; or an indication or classification of a gesture performed in the environment accessed by the wireless signals.

In some implementations, the motion detection system can be implemented using one or more motion detection algorithms. Example motion detection algorithms that can be used to detect motion based on wireless signals include the techniques described in U.S. Pat. No. 9,523,760 entitled "Detecting Motion Based on Repeated Wireless Transmissions," U.S. Pat. No. 9,584,974 entitled "Detecting Motion Based on Reference Signal Transmissions," U.S. Pat. No. 10,051,414 entitled "Detecting Motion Based On Decompositions Of Channel Response Variations," U.S. Pat. No. 10,048,350 entitled "Motion Detection Based on Groupings of Statistical Parameters of Wireless Signals," U.S. Pat. No. 10,108,903 entitled "Motion Detection Based on Machine Learning of Wireless Signal Properties," U.S. Pat. No. 10,109,167 entitled "Motion Localization in a Wireless Mesh Network Based on Motion Indicator Values," U.S. Pat. No. 10,109,168 entitled "Motion Localization Based on Channel Response Characteristics," U.S. Pat. No. 10,743,143 entitled "Determining a Motion Zone for a Location of Motion Detected by Wireless Signals," U.S. Pat. No. 10,605,908 entitled "Motion Detection Based on Beamforming Dynamic Information from Wireless Standard Client Devices," U.S. Pat. No. 10,605,907 entitled "Motion Detection by a Central Controller Using Beamforming Dynamic Information," U.S. Pat. No. 10,600,314 entitled "Modifying Sensitivity Settings in a Motion Detection System," U.S. Pat. No. 10,567,914 entitled "Initializing Probability Vectors for Determining a Location of Motion Detected from Wireless Signals," U.S. Pat. No. 10,565,860 entitled "Offline Tuning System for Detecting New Motion Zones in a Motion Detection System," U.S. Pat. No. 10,506,384 entitled "Determining a Location of Motion Detected from Wireless Signals Based on Prior Probability," U.S. Pat. No. 10,499,364 entitled "Identifying Static Leaf Nodes in a Motion Detection System," U.S. Pat. No. 10,498,467 entitled "Classifying Static Leaf Nodes in a Motion Detection System," U.S. Pat. No. 10,460,581 entitled "Determining a Confidence for a Motion Zone Identified as a Location of Motion for Motion Detected by Wireless Signals," U.S. Pat. No. 10,459,076 entitled "Motion Detection based on Beamforming Dynamic Information," U.S. Pat. No. 10,459,074 entitled "Determining a Location of Motion Detected from Wireless Signals Based on Wireless Link Counting," U.S. Pat. No. 10,438,468 entitled "Motion Localization in a Wireless Mesh Network Based on Motion Indicator Values," U.S. Pat. No. 10,404,387 entitled "Determining Motion Zones in a Space Traversed by Wireless Signals," U.S. Pat. No. 10,393,866 entitled "Detecting Presence Based on Wireless Signal Analysis," U.S. Pat. No. 10,380,856 entitled "Motion Localization Based on Channel Response Characteristics," U.S. Pat. No. 10,318,890 entitled "Training Data for a Motion Detection System using Data from a Sensor Device," U.S. Pat. No. 10,264,405 entitled "Motion Detection in Mesh Networks," U.S. Pat. No. 10,228,439 entitled "Motion Detection Based on Filtered Statistical Parameters of Wireless Signals," U.S. Pat. No. 10,129,853 entitled "Operating a Motion Detection Channel in a Wireless Communication Network," U.S. Pat. No. 10,111,228 entitled "Selecting Wireless Communication Channels Based on Signal Quality Metrics," and other techniques.

FIG. 1 illustrates an example wireless communication system 100. The wireless communication system 100 may perform one or more operations of a motion detection system. The technical improvements and advantages achieved from using the wireless communication system 100 to detect motion are also applicable in examples where the wireless communication system 100 is used for another wireless sensing application.

The example wireless communication system 100 includes three wireless communication devices 102A, 102B, 102C. The example wireless communication system 100 may include additional wireless communication devices 102 and/or other components (e.g., one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include: networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In some cases, one or more of the wireless communication devices 102 is a Wi-Fi access point or another type of wireless access point (WAP). In some cases, one or more of the wireless communication devices 102 is an access point of a wireless mesh network, such as, for example, a commercially-available mesh network system (e.g., GOOGLE Wi-Fi, EERO mesh, etc.). In some instances, one or more of the wireless communication devices 102 can be implemented as wireless access points (APs) in a mesh network, while the other wireless communication device(s) 102 are implemented as leaf devices (e.g., mobile devices, smart devices, etc.) that access the mesh network through one of the APs. In some cases, one or more of the wireless communication devices 102 is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless network.

In the example shown in FIG. 1, the wireless communication devices transmit wireless signals to each other over wireless communication links (e.g., according to a wireless network standard or a non-standard wireless communication protocol), and the wireless signals communicated between the devices can be used as motion probes to detect motion of objects in the signal paths between the devices. In some implementations, standard signals (e.g., channel sounding signals, beacon signals), non-standard reference signals, or other types of wireless signals can be used as motion probes.

In the example shown in FIG. 1, the wireless communication link between the wireless communication devices 102A, 102C can be used to probe a first motion detection zone 110A, the wireless communication link between the wireless communication devices 102B, 102C can be used to probe a second motion detection zone 110B, and the wireless communication link between the wireless communication device 102A, 102B can be used to probe a third motion detection zone 110C. In some instances, the motion detection zones 110 can include, for example, air, solid materials, liquids, or another medium through which wireless electromagnetic signals may propagate.

In the example shown in FIG. 1, when an object moves in any of the motion detection zones 110, the motion detection system may detect the motion based on signals transmitted through the relevant motion detection zone 110. Generally, the object can be any type of static or moveable object, and can be living or inanimate. For example, the object can be a human (e.g., the person 106 shown in FIG. 1), an animal, an inorganic object, or another device, apparatus, or assembly, an object that defines all or part of the boundary of a space (e.g., a wall, door, window, etc.), or another type of object.

In some examples, the wireless signals propagate through a structure (e.g., a wall) before or after interacting with a moving object, which may allow the object's motion to be detected without an optical line-of-sight between the moving object and the transmission or receiving hardware. In some instances, the motion detection system may communicate the motion detection event to another device or system, such as a security system or a control center.

In some cases, the wireless communication devices 102 themselves are configured to perform one or more operations of the motion detection system, for example, by executing computer-readable instructions (e.g., software or firmware) on the wireless communication devices. For example, each device may process received wireless signals to detect motion based on changes in the communication channel. In some cases, another device (e.g., a remote server, a cloud-based computer system, a network-attached device, etc.) is configured to perform one or more operations of the motion detection system. For example, each wireless communication device 102 may send channel information to a specified device, system, or service that performs operations of the motion detection system.

In an example aspect of operation, wireless communication devices 102A, 102B may broadcast wireless signals or address wireless signals to the other wireless communication device 102C, and the wireless communication device 102C (and potentially other devices) receives the wireless signals transmitted by the wireless communication devices 102A, 102B. The wireless communication device 102C (or another system or device) then processes the received wireless signals to detect motion of an object in a space accessed by the wireless signals (e.g., in the zones 110A, 11B). In some instances, the wireless communication device 102C (or another system or device) may perform one or more operations of a motion detection system.

Figure 2B:
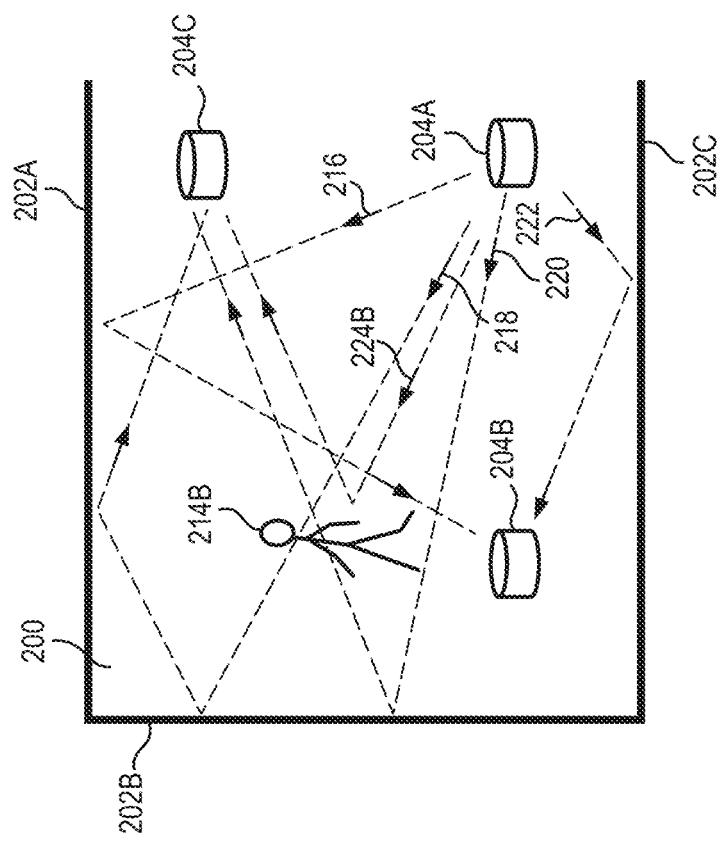
FIGS. 2A-2B are diagrams showing example wireless signals communicated between wireless communication devices.
Figure 2A:
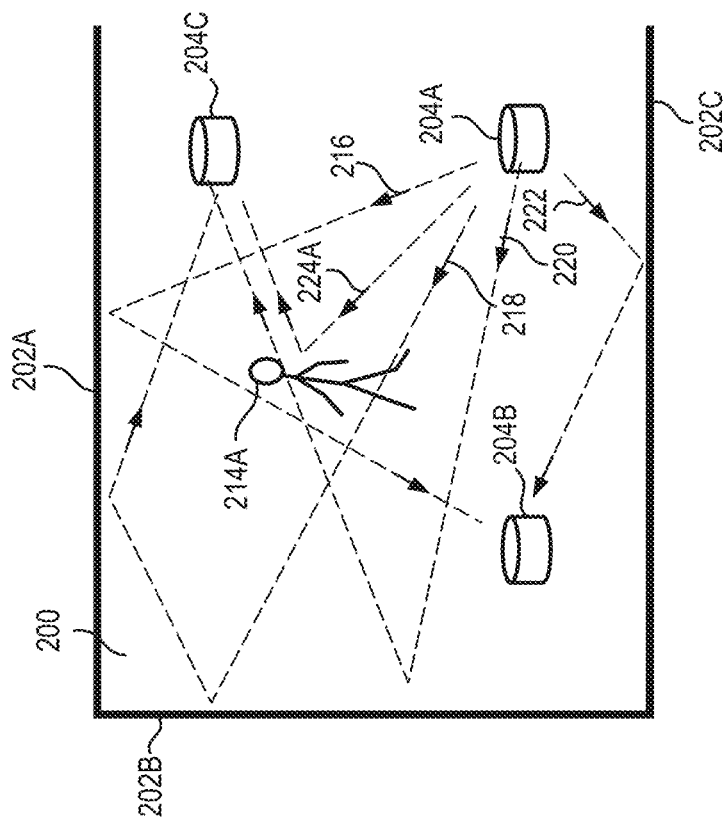

FIGS. 2A and 2B are diagrams showing example wireless signals communicated between wireless communication devices 204A, 204B, 204C. The wireless communication devices 204A, 204B, 204C can be, for example, the wireless communication devices 102A, 102B, 102C shown in FIG. 1, or may be other types of wireless communication devices.

In some cases, a combination of one or more of the wireless communication devices 204A, 204B, 204C can be part of, or may be used by, a motion detection system. The example wireless communication devices 204A, 204B, 204C can transmit wireless signals through a space 200. The example space 200 may be completely or partially enclosed or open at one or more boundaries of the space 200. The space 200 can be or may include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A transmits wireless motion probe signals repeatedly (e.g., periodically, intermittently, at scheduled, unscheduled, or random intervals, etc.). The second and third wireless communication devices 204B, 204C receive signals based on the motion probe signals transmitted by the wireless communication device 204A.

As shown, an object is in a first position 214A at an initial time (t0) in FIG. 2A, and the object has moved to a second position 214B at subsequent time (t1) in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object. In the example shown in FIGS. 2A and 2B, the wireless communication devices 204A, 204B, 204C are stationary and are, consequently, at the same position at the initial time t0 and at the subsequent time t1. However, in other examples, one or more of the wireless communication devices 204A, 204B, 204C can be mobile and may move between initial time t0 and subsequent time t1.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between time t0 in FIG. 2A and time t1 in FIG. 2B, the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B can experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

The transmitted signal can have a number of frequency components in a frequency bandwidth, and the transmitted signal may include one or more bands within the frequency bandwidth. The transmitted signal may be transmitted from the first wireless communication device 204A in an omni-directional manner, in a directional manner, or otherwise. In the example shown, the wireless signals traverse multiple respective paths in the space 200, and the signal along each path can become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset applied to a wireless signal along a signal path can change, and hence, the transfer function of the space 200 can change. When the same wireless signal is transmitted from the first wireless communication device 204A, if the transfer function of the space 200 changes, the output of that transfer function, e.g. the received signal, can also change. A change in the received signal can be used to detect motion of an object. Conversely, in some cases, if the transfer function of the space does not change, the output of the transfer function—the received signal—may not change.

Figure 2C:
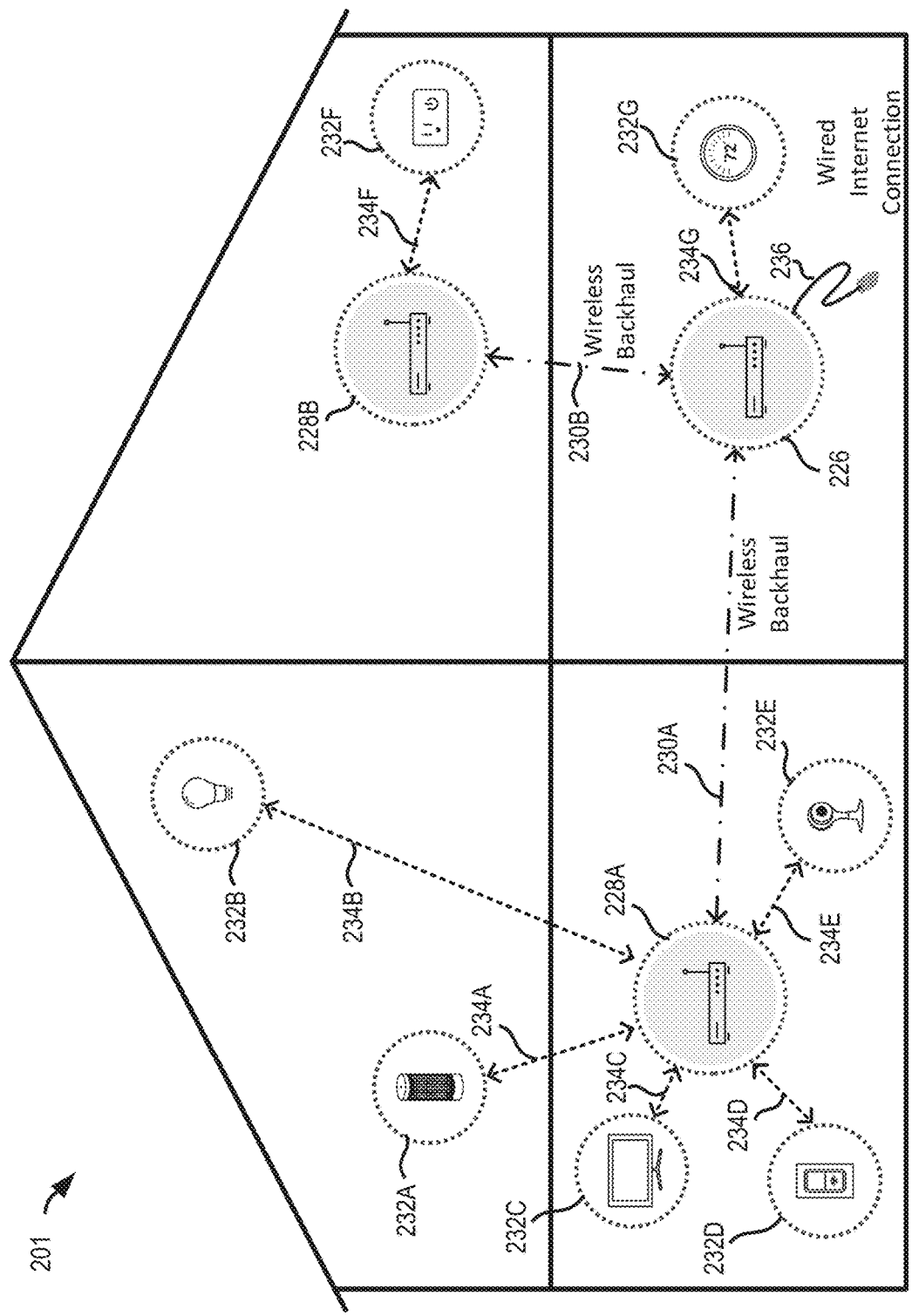
FIG. 2C is a diagram showing an example wireless sensing system operating to detect motion in a space.

FIG. 2C is a diagram showing an example wireless sensing system operating to detect motion in a space 201. The example space 201 shown in FIG. 2C is a home that includes multiple distinct spatial regions or zones. In the example shown, the wireless motion detection system uses a multi-AP home network topology (e.g., mesh network or a Self-Organizing-Network (SON)), which includes three access points (APs): a central access point 226 and two extension access points 228A, 228B. In a typical multi-AP home network, each AP typically supports multiple bands (2.4G, 5G, 6G), and multiple bands may be enabled at the same time. Each AP can use a different Wi-Fi channel to serve its clients, as this may allow for better spectrum efficiency.

In the example shown in FIG. 2C, the wireless communication network includes a central access point 226. In a multi-AP home Wi-Fi network, one AP may be denoted as the central AP. This selection, which is often managed by manufacturer software running on each AP, is typically the AP that has a wired Internet connection 236. The other APs 228A, 228B connect to the central AP 226 wirelessly, through respective wireless backhaul connections 230A, 230B. The central AP 226 may select a wireless channel different from the extension APs to serve its connected clients.

In the example shown in FIG. 2C, the extension APs 228A, 228B extend the range of the central AP 226, by allowing devices to connect to a potentially closer AP or different channel. The end user need not be aware of which AP the device has connected to, as all services and connectivity would generally be identical. In addition to serving all connected clients, the extension APs 228A, 228B connect to the central AP 226 using the wireless backhaul connections 230A, 230B to move network traffic between other APs and provide a gateway to the Internet. Each extension AP 228A, 228B may select a different channel to serve its connected clients.

In the example shown in FIG. 2C, client devices (e.g., Wi-Fi client devices) 232A, 232B, 232C, 232D, 232E, 232F, 232G are associated with either the central AP 226 or one of the extension APs 228 using a respective wireless link 234A, 234B, 234C, 234D, 234E, 234F, 234G. The client devices 232 that connect to the multi-AP network may operate as leaf nodes in the multi-AP network. In some implementations, the client devices 232 may include wireless-enabled devices (e.g., mobile devices, a smartphone, a smart watch, a tablet, a laptop computer, a smart thermostat, a wireless-enabled camera, a smart TV, a wireless-enabled speaker, a wireless-enabled power socket, etc.).

When the client devices 232 seek to connect to and associate with their respective APs 226, 228, the client devices 232 may go through an authentication and association phase with their respective APs 226, 228. Among other things, the association phase assigns address information (e.g., an association ID or another type of unique identifier) to each of the client devices 232. For example, within the IEEE 802.11 family of standards for Wi-Fi, each of the client devices 232 can identify itself using a unique address (e.g., a 48-bit address, an example being the MAC address), although the client devices 232 may be identified using other types of identifiers embedded within one or more fields of a message. The address information (e.g., MAC address or another type of unique identifier) can be either hardcoded and fixed, or randomly generated according to the network address rules at the start of the association process. Once the client devices 232 have associated to their respective APs 226, 228, their respective address information may remain fixed. Subsequently, a transmission by the APs 226, 228 or the client devices 232 typically includes the address information (e.g., MAC address) of the transmitting wireless device and the address information (e.g., MAC address) of the receiving device.

In the example shown in FIG. 2C, the wireless backhaul connections 230A, 230B carry data between the APs and may also be used for motion detection. Each of the wireless backhaul channels (or frequency bands) may be different than the channels (or frequency bands) used for serving the connected Wi-Fi devices.

In the example shown in FIG. 2C, wireless links 234A, 234B, 234C, 234D, 234E, 234F, 234G may include a frequency channel used by the client devices 232A, 232B, 232C, 232D, 232E, 232F, 232G to communicate with their respective APs 226, 228. Each AP can select its own channel independently to serve their respective client devices, and the wireless links 234 may be used for data communications as well as motion detection.

The motion detection system, which may include one or more motion detection or localization processes running on one or more of the client devices 232 or on one or more of the APs 226, 228, may collect and process data (e.g., channel information) corresponding to local links that are participating in the operation of the wireless sensing system. The motion detection system can be installed as a software or firmware application on the client devices 232 or on the APs 226, 228, or may be part of the operating systems of the client devices 232 or the APs 226, 228.

In some implementations, the APs 226, 228 do not contain motion detection software and are not otherwise configured to perform motion detection in the space 201. Instead, in such implementations, the operations of the motion detection system are executed on one or more of the client devices 232. In some implementations, the channel information may be obtained by the client devices 232 by receiving wireless signals from the APs 226, 228 (or possibly from other client devices 232) and processing the wireless signal to obtain the channel information. For example, the motion detection system running on the client devices 232 can have access to channel information provided by the client device's radio firmware (e.g., Wi-Fi radio firmware) so that channel information may be collected and processed.

In some implementations, the client devices 232 send a request to their corresponding AP 226, 228 to transmit wireless signals that can be used by the client device as motion probes to detect motion of objects in the space 201. The request sent to the corresponding AP 226, 228 may be a null data packet frame, a beamforming request, a ping, standard data traffic, or a combination thereof. In some implementations, the client devices 232 are stationary while performing motion detection in the space 201. In other examples, one or more of the client devices 232 can be mobile and may move within the space 201 while performing motion detection.

Mathematically, a signal f(t) transmitted from a wireless communication device (e.g., the wireless communication device 204A in FIGS. 2A and 2B or the APs 226, 228 in FIG. 2C) may be described according to Equation (1):

$$f(t) = \sum_{n=-\infty}^{\infty} c_n e^{j\omega_n t} \quad (1)$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \quad (2)$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \quad (3)$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \quad (4)$$

The received signal R at a wireless communication device (e.g., the wireless communication devices 204B, 204C in FIGS. 2A and 2B or the client devices 232 in FIG. 2C) can then be analyzed (e.g., using one or more motion detection algorithms) to detect motion. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $Y_n$ may be represented as follows in Equation (5):

$$Y_n = \sum_k c_n \alpha_{n,k} e^{j\phi_{n,k}}. \quad (5)$$

The complex value $Y_n$ for a given frequency component $\omega_n$ indicates a relative magnitude and phase offset of the received signal at that frequency component $\omega_n$. The signal f(t) may be repeatedly transmitted within a time period, and the complex value $Y_n$ can be obtained for each transmitted signal f(t). When an object moves in the space, the complex value $Y_n$ changes over the time period due to the channel response $\alpha_{n,k}$ of the space changing. Accordingly, a change detected in the channel response (and thus, the complex value KJ can be indicative of motion of an object within the communication channel. Conversely, a stable channel response may indicate lack of motion. Thus, in some implementations, the complex values $Y_n$ for each of multiple devices in a wireless network can be processed to detect whether motion has occurred in a space traversed by the transmitted signals f(t).

In another aspect of FIGS. 2A, 2B, 2C, beamforming state information may be used to detect whether motion has occurred in a space traversed by the transmitted signals f(t). For example, beamforming may be performed between devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. In some instances, changes to the steering or feedback properties used in the beamforming process indicate changes, which may be caused by moving objects in the space accessed by the wireless signals. For example, motion may be detected by identifying substantial changes in the communication channel, e.g. as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, these beamforming matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, "modes" of a beamforming matrix (e.g., a feedback matrix or steering matrix) can be used to generate the spatial map. The spatial map may be used to detect the presence of motion in the space or to detect a location of the detected motion.

Figure 3:
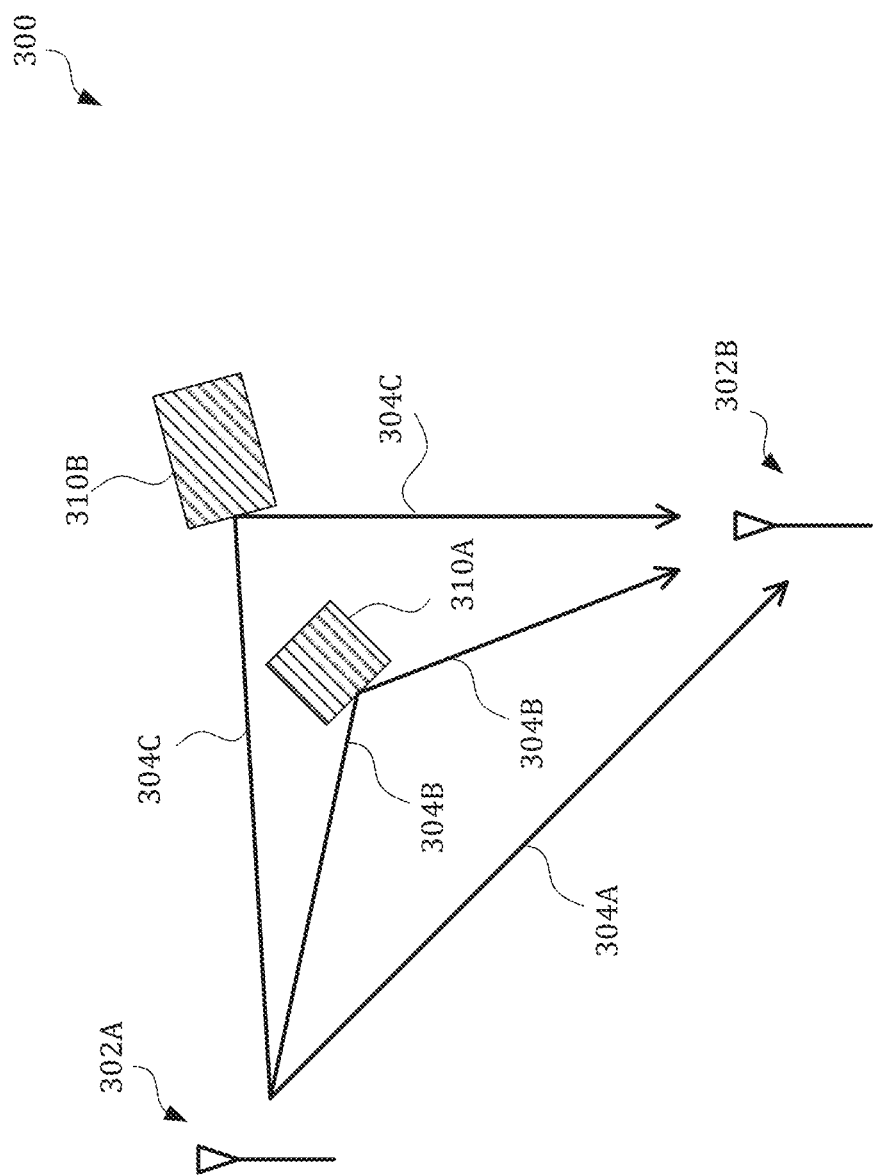
FIG. 3 is a diagram showing example signal paths in a wireless communication system.

In some implementations, a space through which a set of wireless signals is transmitted may be described as a frequency-domain filter that applies a transfer function to the set of wireless signals. Changes observed in the frequency-domain filter over time can be indicative of motion of an object within the space. FIG. 3 is a diagram showing example signal paths in a wireless communication system 300. The example wireless communication system 300 shown in FIG. 3 includes wireless communication devices 302A, 302B. The wireless communication devices 302A, 302B can be, for example, the wireless communication devices 102A, 102B shown in FIG. 1, the wireless communication devices 204A, 204B, 204C shown in FIGS. 2A and 2B, the devices 226, 228, 232 shown in FIG. 2C, or they may be other types of wireless communication devices. The wireless communication system 300 operates in an environment that includes two scatterers 310A, 310B. The wireless communication system 300 and its environment may include additional or different features.

In the example shown in FIG. 3, the wireless communication device 302A transmits a radio frequency (RF) wireless signal, and the wireless communication device 302B receives the wireless signal. The wireless signal transmitted by the wireless communication device 302A may be one of the wireless signals in the set of wireless signals transmitted through the environment between the wireless communication devices 302A, 302B. In the environment between the wireless communication devices 302A, 302B, the wireless signal interacts with the scatterers 310A, 310B. The scatterers 310A, 310B can be any type of physical object or medium that scatters radio frequency signals, for example, part of a structure, furniture, a living object, etc.

In the example shown in FIG. 3, the wireless signal traverses a direct signal path 304A and two indirect signal paths 304B, 304C. Along signal path 304B from the wireless communication device 302A, the wireless signal reflects off the scatterer 310A before reaching the wireless communication device 302B. Along signal path 304C from the wireless communication device 302A, the wireless signal reflects off the scatterer 310B before reaching the wireless communication device 302B.

The propagation environment represented by the signal paths shown in FIG. 3 can be described as a time-domain filter. For instance, the characteristic response, or impulse response, of the propagation environment shown in FIG. 3 can be represented by the time-domain filter:

$$h(t) = \sum_{k=1}^{3} \alpha_k \delta(t - \tau_k) \quad (6)$$

In some instances, the time-domain filter h(t) may be referred to as a time-domain channel response, since the time-domain filter h(t) is the response of the propagation environment to a unit impulse transmitted by wireless communication device 302A at time t=0. In Equation (6), the integer k indexes the three signal paths, and the coefficients $\alpha_k$ are complex phasors that represent the magnitude and phase of the scattering along each signal path. The values of the coefficients $\alpha_k$ are determined by physical characteristics of the environment, for example, free space propagation and the type of scattering objects present. In some examples, increasing attenuation along a signal path (e.g., by an absorbing medium like a human body or otherwise) may generally decrease the magnitude of the corresponding coefficient $\alpha_k$. Similarly, a human body or another medium acting as a scatterer can change the magnitude and phase of the coefficients $\alpha_k$.

Figure 4:
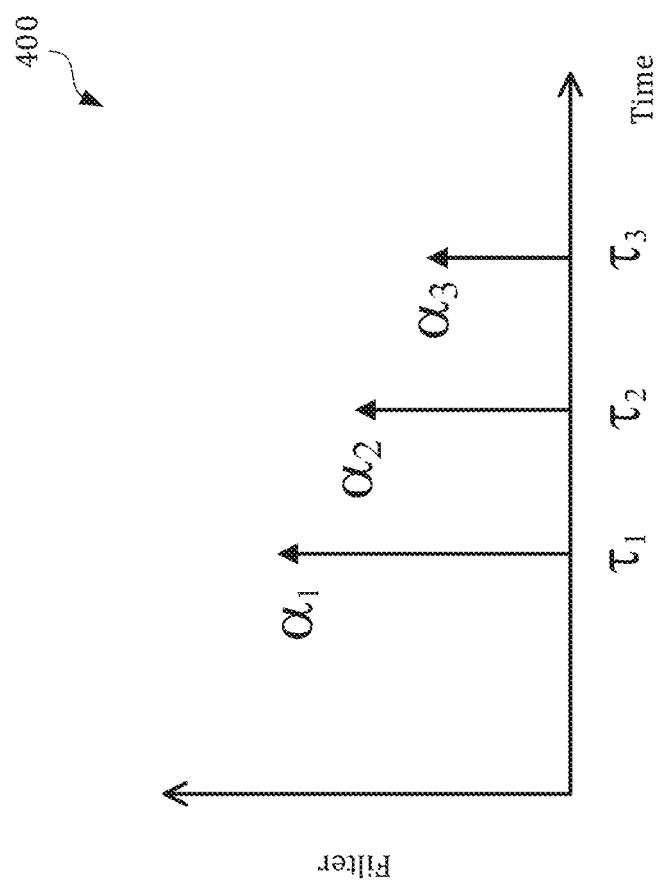
FIG. 4 is a plot showing an example time-domain filter representation of a propagation environment.

FIG. 4 is a plot 400 showing an example time-domain filter representation of a propagation environment. In particular, the plot 400 in FIG. 4 shows a time-domain representation of the filter h(t) in Equation (6) above. The horizontal axis of the plot 400 represents time, and the vertical axis represents the value of the filter h(t). The value of the filter h(t) can be a complex number having a magnitude and a phase, and the vertical axis of the example plot 400 in FIG. 4 shows the magnitude of the filter h(t). As shown in FIG. 4, the filter can be described by three pulses distributed across the time axis (at times $\tau_1$, $\tau_2$, and $\tau_3$). In this example, the pulse at time $\tau_1$ represents the impulse response corresponding to signal path 304A in FIG. 3, the pulse at time $\tau_2$ represents the impulse response corresponding to signal path 304B in FIG. 3, and the pulse at time $\tau_3$ represents the impulse response corresponding to signal path 304C in FIG. 3. The size of each pulse in FIG. 4 represents the magnitude of the respective coefficient $\alpha_k$ for each signal path.

The time-domain representation of the filter h(t) may have additional or different pulses or other features. The number of pulses, as well as their respective locations on the time axis and their respective magnitudes, may vary according to the scattering profile of the environment. For example, if an object were to show up towards the end of the coverage area (e.g., at scatterer 310B), this may cause the third pulse (at time $\tau_3$) to move towards the left or the right. Typically, the first pulse (at time $\tau_1$) represents the earliest pulse or direct line of sight in most systems; accordingly, if an object were to come in the line of sight between transmitter and receiver, this pulse (at time $\tau_1$) would be affected. In some instances, distance and direction of motion (relative to the transmitter and receiver) in the propagation environment can be inferred by looking at the behavior of these pulses over time. As an example, in some instances, an object moving from the end of the coverage area towards the line of sight can affect the third, second, and first pulses in that order, while an object moving away from the line of sight to the end of the coverage area can affect the pulses in the opposite order.

Taking the Fourier transform of the time-domain channel response h(t) from Equation (6) provides a frequency representation of the filter:

$$H(f) = \sum_{k=1}^{3} \alpha_k e^{-j2\pi f \tau_k} \quad (7)$$

In some instances, the frequency representation H(f) may be referred to as a frequency-domain channel response or the channel state information. In the frequency representation H(f) shown in Equation (7), each impulse from Equation (6) has been converted to a complex exponential (a sine and cosine wave). Each component of the exponential in the frequency domain has a specific frequency of rotation which is given by an associated pulse time $\tau_k$ with a certain phase.

In some implementations, each of the wireless signals in the set of wireless signals that is transmitted in the environment may be an orthogonal frequency division multiplexing (OFDM) signal, which can include, for example, a PHY frame. The PHY frame can, in some instances, include one or more Legacy PHY fields (e.g., L-LTF, L-STF), one or more MIMO training fields (e.g., HE-LTF, VHT-LTF, HT- LTF), or both. The fields in the PHY frames of the wireless signals in the set of wireless signals can be used to obtain a set of observed frequency-domain channel responses $\{H_1(f), H_2(f), \ldots, H_n(f)\}$. Each frequency-domain channel response $H_i(f)$ in the set of frequency-domain channel responses $\{H_1(f), H_2(f), \ldots, H_n(f)\}$ may correspond to a respective wireless signal in the set of wireless signals.

Motion of an object in the space (e.g., the environment between the wireless communication devices 302A, 302B) can cause a change in one or more frequency-domain channel responses in the set of frequency-domain channel responses $\{H_1(f), H_2(f), \ldots, H_n(f)\}$. For example, motion of an object in the space can cause one or more of the frequency-domain channel responses $H_1(f), H_2(f), \ldots, H_n(f)$ to experience a change in their coefficients $\alpha_k$, pulse times $\tau_k$, or both. In some implementations, changes observed in at least one of the coefficients $\alpha_k$ or pulse times $\tau_k$ in the set of frequency-domain channel responses $\{H_1(f), H_2(f), \ldots, H_n(f)\}$ can be used to detect motion of an object within the space. Conversely, a stable set of frequency-domain channel responses $\{H_1(f), H_2(f), \ldots, H_n(f)\}$ may indicate lack of motion.

In some instances, changes in the coefficients $\alpha_k$ or pulse times $\tau_k$ of a frequency-domain channel response $H_i(f)$ can be caused by device- or system-level impairments (e.g., noise or distortions) that are not related to changes in the physical environment (e.g., motion of an object in the space). For example, electronic impairments on the device-level or the system-level (or both) may cause a change in the coefficients $\alpha_k$ or pulse times $\tau_k$ of one or more frequency-domain channel responses in the set of frequency-domain channel responses $\{H_1(f), H_2(f), \ldots, H_n(f)\}$. Example device- or system-level electronic impairments include one or more carrier frequency offsets between the transmitter (e.g., the wireless communication device 302A) and the receiver (e.g., the wireless communication device 302B), phase noise in the radio subsystem or baseband subsystem of the transmitter or receiver, a delay in packet detection at the receiver, imperfect convergence of an automatic gain control loop of an amplifier (or a chain of amplifiers) in the transmitter or receiver, timing drifts in electronic components in the transmitter or receiver, non-linearity in the measurement noise of the transmitter or receiver, interference from neighboring transmitters, or other types of device- or system-level electronic impairments in a wireless communication system.

Impairments that are not related to changes in the physical environment (e.g., motion) can corrupt the set of frequency-domain channel responses $\{H_1(f), H_2(f), \ldots, H_n(f)\}$, and motion detection errors can occur when motion is detected using the corrupted set of frequency-domain channel responses $\{H_1(f), H_2(f), \ldots, H_n(f)\}$. For example, even when there is no motion in the space, electronic impairments can cause a change in the coefficients $\alpha_k$ or pulse times $\tau_k$ of one or more frequency-domain channel responses, which in turn can lead to an erroneous indication that motion has occurred in the space (e.g., one or more false positives).

Figure 5:
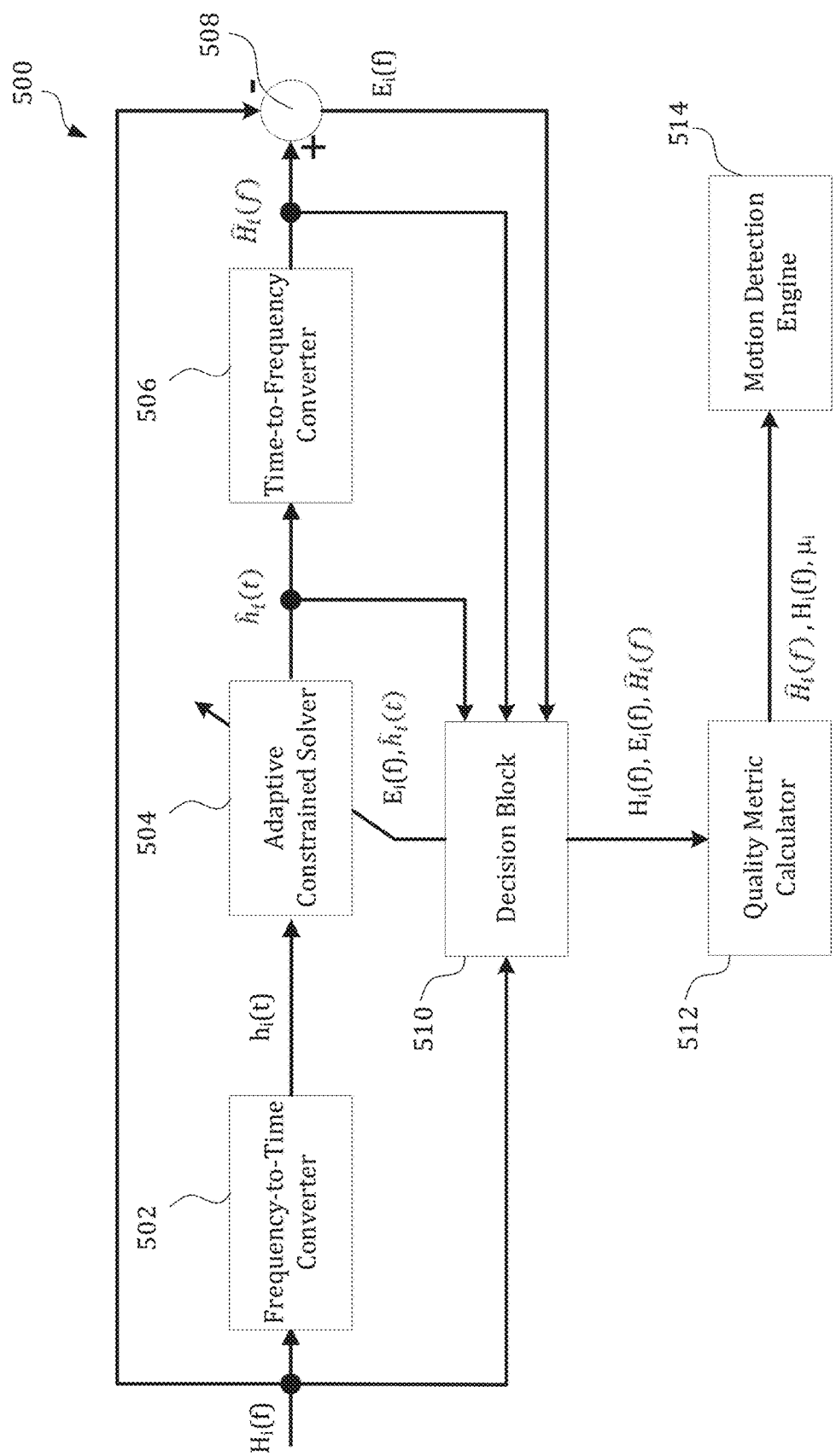
FIG. 5 is a schematic diagram of an example signal processing system for a motion detection system.

FIG. 5 is a schematic diagram of an example signal processing system 500 for a motion detection system. In some implementations, the system 500 can be used to process each frequency-domain channel response $H_i(f)$ from the set of observed frequency-domain channel responses $\{H_1(f), H_2(f), \ldots, H_n(f)\}$ to filter out noise or distortions that are not related to changes in the physical environment. In some implementations, the system 500 accepts the set of observed frequency-domain channel responses $\{H_1(f), H_2(f), \ldots, H_n(f)\}$ as an input and generates a set of reconstructed frequency-domain channel responses $\{\hat{H}_1(f), \hat{H}_2(f), \ldots, \hat{H}_n(f)\}$ and a set of quality metrics $\{\mu_1, \mu_2, \ldots, \mu_n\}$. In some implementations, each observed frequency-domain channel response $H_i(f)$ from the set of observed frequency-domain channel responses $\{H_1(f), H_2(f), \ldots, H_n(f)\}$ has a corresponding reconstructed frequency-domain channel response $\hat{H}_i(f)$ and a corresponding quality metric $\mu_i$. In some instances, the quality metric $\mu_i$ may be a measure of an extent to which the observed frequency-domain channel response $H_i(f)$ has been corrupted by impairments that are not related to changes in the physical environment. Therefore, the quality metric $\mu_i$ may be analogous to a signal-to-noise ratio (SNR) of the corresponding frequency-domain channel response $H_i(f)$. The system 500 can be used to increase the accuracy of a motion detection system. For example, the false positive rate of a motion detection system can be reduced by filtering out the effects of device- or system-level electronic impairments on the observed frequency-domain channel responses $\{H_1(f), H_2(f), \ldots, H_n(f)\}$ and by taking the set of quality metrics $\{\mu_1, \mu_2, \ldots, \mu_n\}$ into account when detecting motion.

As shown in FIG. 5, an observed frequency-domain channel response $H_i(f)$ is received (e.g., at a wireless communication device) over a set of frequencies. The observed frequency-domain channel response $H_i(f)$ may be obtained based on frequency-domain signals included in one or more Legacy PHY fields (e.g., L-LTF, L-STF) of the received wireless signal, or based on frequency-domain signals included in one or more MIMO training fields (e.g., HE-LTF, VHT-LTF, HT-LTF) of the received wireless signal.

The system 500 includes a frequency-to-time converter block 502 that transforms the frequency-domain channel response $H_i(f)$ to its corresponding time-domain channel response $h_i(t)$. In some implementations, the frequency-to-time converter block 502 may implement a Fourier transform, an inverse Fourier transform, or another type of transformation that converts a frequency-domain signal to its corresponding time-domain signal. In some implementations, such as in the example shown in FIG. 3, the time-domain channel response $h_i(t)$ can be expressed in terms of its coefficients $\alpha_k$ and pulse times $\tau_k$.

The system 500 includes an adaptive constrained solver 504 that accepts the time-domain channel response $h_i(t)$ as an input. In some implementations, the adaptive constrained solver 504 executes an iterative constrained least squares optimization process that minimizes an error between the observed frequency-domain channel response $H_i(f)$ and the reconstructed frequency-domain channel response $\hat{H}_i(f)$. The adaptive constrained solver 504 generates a filtered time-domain channel response $\hat{h}_i(t)$ as an output.

The adaptive constrained solver 504 may impose one or more constraints in the time-domain. Specifically, the adaptive constrained solver 504 may impose one or more constraints on the time-domain channel response $h_i(t)$ or a filtered time-domain channel response $\hat{h}_i(t)$ obtained from a previous iteration of the iterative constrained least squares optimization process. The one or more constraints may be a constraint on the coefficients $\alpha_k$ of the pulses in the time-domain channel response $h_i(t)$ or the filtered time-domain channel response $\hat{h}_i(t)$ obtained from a previous iteration. Additionally or alternatively, the one or more constraints may be a constraint on the pulse times $\tau_k$ in the time-domain channel response $h_i(t)$ or the filtered time-domain channel response $\hat{h}_i(t)$ obtained from a previous iteration.

In some instances, the one or more constraints may be representative of the propagation environment in which the wireless communication system operates and is indicative of scattering along signal paths in the propagation environment. Therefore, by imposing the one or more constraints on the time-domain channel response $h_t(t)$, the system 500 filters out, from the time-domain channel response $h_t(t)$, noise or distortions that may not be related to changes in the physical environment.

In some implementations, the one or more constraints are model-based constraints that are known by the system 500 a priori and may depend, at least in part, on the standard path loss propagation model that most accurately models the propagation environment in which the wireless communication system operates. For example, the one or more constraints may depend, at least in part, on propagation loss in the space, the type of wireless communication devices operating in the propagation environment, a model of the propagation environment (e.g., indoor, outdoor, urban area, rural area, etc.), and potentially other factors. Example standard path loss propagation models that may affect the one or more constraints used by the system 500 include the free space path loss model, the Okumura model, the Hata path loss model, the Hata-Okumura path loss model, the Hata-Okumura Extended path loss model, the COST 231 Extended Hata path loss model, the Walfisch-Ikegami model, the Stanford University Interim (SUI) path loss model, or other types of path loss models.

FIG. 6A is a plot 600 showing an example time-domain channel response $h_t(t)$ obtained from an observed frequency-domain channel response $H_t(f)$. FIG. 6B is a plot 601 showing an example filtered time-domain channel response $\hat{h}_t(t)$ obtained from a first iteration of the adaptive constrained solver 504. The horizontal axes of the plots 600, 601 represent time, and the vertical axes represent the value of the respective channel responses $h_t(t)$, $\hat{h}_t(t)$. In the example shown in FIG. 6A, the time-domain channel response $h_t(t)$ includes pulses 602, 604, 606, 608, 610 having respective amplitudes and pulse times.

In some instances, the adaptive constrained solver 504 may impose a constraint 612 on a time duration (e.g., maximum time duration) of the time-domain channel response $h_t(t)$ (as seen in the example of FIG. 6A) or of the filtered time-domain channel response $\hat{h}_t(t)$ obtained from a previous iteration. In some implementations, the constraint 612 can be indicative of a maximum delay with which a pulse can reach a receiving wireless communication device, which in turn may be determined by the maximum attenuation a pulse can experience and still be captured within the dynamic range of the radio of the receiving wireless communication device. Additionally or alternatively, the constraint 612 may be indicative of the range of delays expected in the propagation environment in which the wireless communication system operates. The adaptive constrained solver 504 may, additionally or alternatively, impose a constraint 614 on the amplitudes of the time-domain channel response $h_t(t)$ (as seen in the example of FIG. 6A) or of the filtered time-domain channel response $\hat{h}_t(t)$ obtained from a previous iteration. The constraint 614 on the amplitudes can be a function of time and may be indicative of the expected attenuation along the various signal paths in the propagation environment.

In some implementations, the system 500 operates based on the premise that pulses outside of the respective constraints 612, 614 are caused, at least in part, by impairments (e.g., noise or distortions) that may not be related to changes in the physical environment. Therefore, in some instances, pulses that are within the respective constraints 612, 614 are retained, while pulses that are outside of the respective constraints 612, 614 are ignored or discarded. As an illustration, in the example of FIG. 6A, pulses 602, 604, 608 comply with the time constraint 612 and the amplitude constraint 614. Although pulse 606 complies with the time constraint 612, it violates the amplitude constraint 614. Similarly, although pulse 610 complies with the amplitude constraint 614, it violates the time constraint 612. As a result, in the example of FIG. 6A, the pulse 610 and at least a portion of pulse 606 are inferred to be caused by noise or distortions that may not be related to changes in the physical environment. Consequently, the pulses 606 and 610 are ignored by the adaptive constrained solver 504 in its first iteration, thereby yielding the filtered time-domain channel response $\hat{h}_t(t)$ shown in FIG. 6B.

The system 500 includes a time-to-frequency converter block 506 that transforms the filtered time-domain channel response $\hat{h}_t(t)$ to its corresponding reconstructed frequency-domain channel response $\hat{H}_t(f)$. The reconstructed frequency-domain channel response $\hat{H}_t(f)$ may represent a filtered version of its corresponding observed frequency-domain channel response $H_t(f)$. In some implementations, the time-to-frequency converter block 506 may implement a Fourier transform, an inverse Fourier transform, or another type of transformation that converts a time-domain signal to its corresponding frequency-domain signal.

The system 500 includes an error calculation block 508 that accepts the observed frequency-domain channel response $H_t(f)$ and its corresponding reconstructed frequency-domain channel response $\hat{H}_t(f)$ as inputs. In some implementations, the error calculation block 508 generates an error signal $E_t(f)$ that is indicative of a difference between the observed frequency-domain channel response $H_t(f)$ and the reconstructed frequency-domain channel response $\hat{H}_t(f)$. In some implementations, the error signal $E_t(f)$ may be generated by subtracting the observed frequency-domain channel response $H_t(f)$ from the reconstructed frequency-domain channel response $\hat{H}_t(f)$, or vice versa.

The system 500 includes a decision block 510 that accepts the error signal $E_t(f)$ and the filtered time-domain channel response $\hat{h}_t(t)$ as inputs. In some implementations, when the filtered time-domain channel response $\hat{h}_t(t)$ provided to the decision block 510 is produced in a first iteration of the adaptive constrained solver 504, the decision block 510 provides the filtered time-domain channel response $\hat{h}_t(t)$ from the first iteration and its corresponding error signal $E_t(f)$ to the adaptive constrained solver 504 so that the adaptive constrained solver 504 can execute another iteration of the constrained least squares optimization process. In the subsequent iteration, the adaptive constrained solver 504 generates an updated time-domain channel response $\hat{h}_t(t)$ based on the filtered time-domain channel response from the first iteration, the error signal $E_t(f)$ from the first iteration, and the one or more constraints.

In some implementations, in the second iteration, the adaptive constrained solver 504 analyzes a characteristic of the error signal $E_t(f)$ from the first iteration and estimates one or more pulses in the time-domain that satisfy the one or more constraints and that correlate with the characteristic of error signal $E_t(f)$ from the first iteration. The adaptive constrained solver 504 then inserts the estimated pulse or pulses into the time-domain channel response from the first iteration to produce the updated time-domain channel response $\hat{h}_t(t)$. In some implementations, the characteristic of the error signal $E_t(f)$ includes a rate of decay of the error signal $E_t(f)$ as a function of frequency, an average rate at which the error signal $E_t(f)$ varies over frequency, or another characteristic of error signal $E_t(f)$. As an example, in some implementations, the mean square of the error signal $E_t(f)$, commonly referred to as the L2 norm, can be used as an optimization criterion. Additionally or alternatively, the L1 norm of the error signal $E_i(f)$ can be used as an optimization criterion depending on the internal assumptions about the form of the indoor channel response.

Figure 7A:
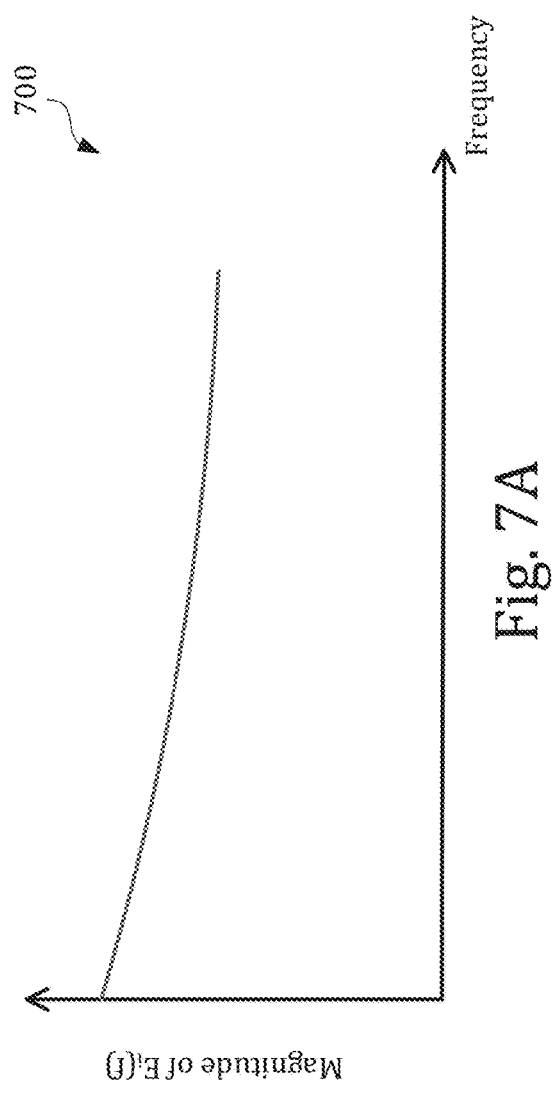
FIGS. 7A, 7C, and 7E are plots showing example error signals $E_i(f)$.
Figure 7B:
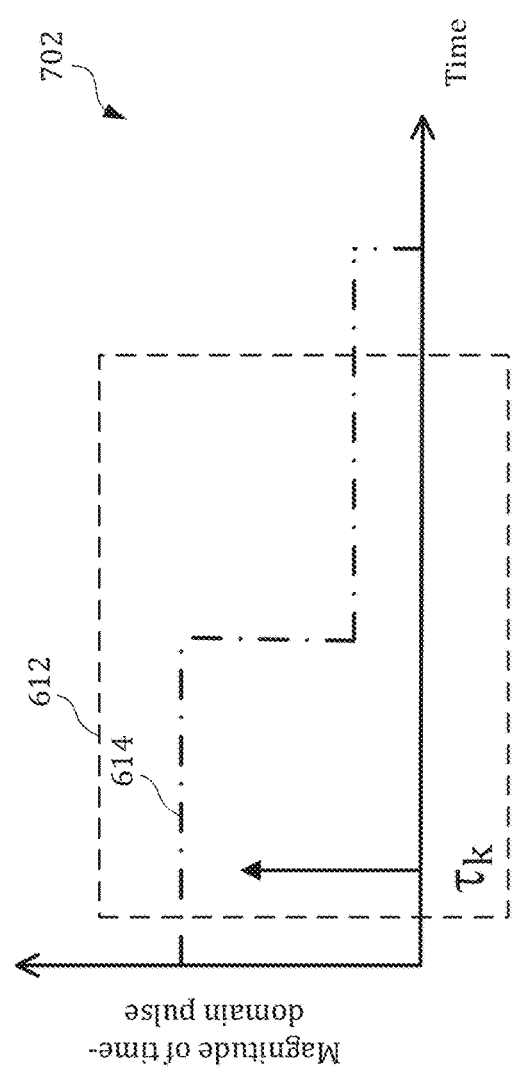
FIGS. 7B, 7D, and 7F are plots showing example time-domain pulses that correlate with the error signals $E_i(f)$ shown in FIGS. 7A, 7C, and 7E, respectively.
Figure 7C:
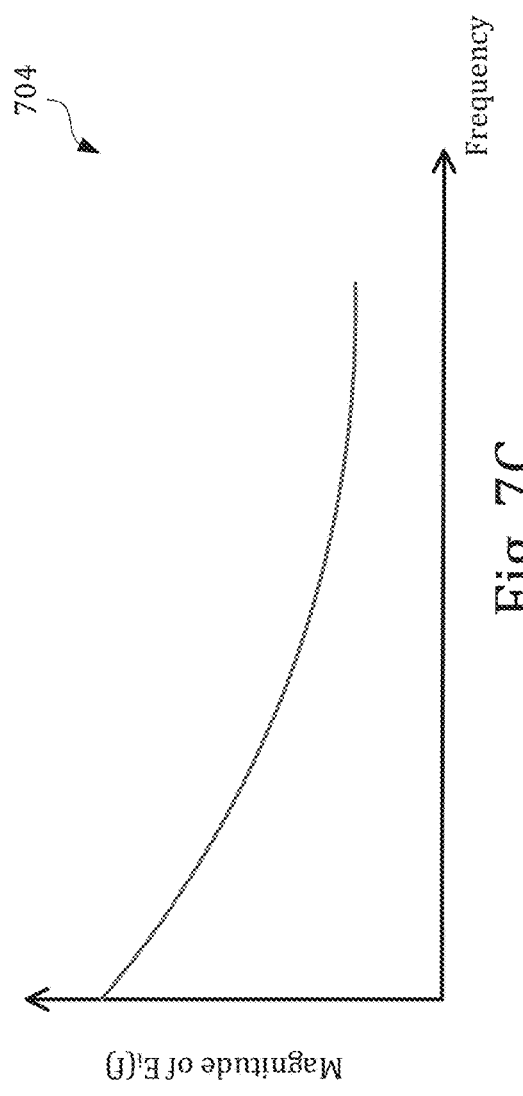
Figure 7D:
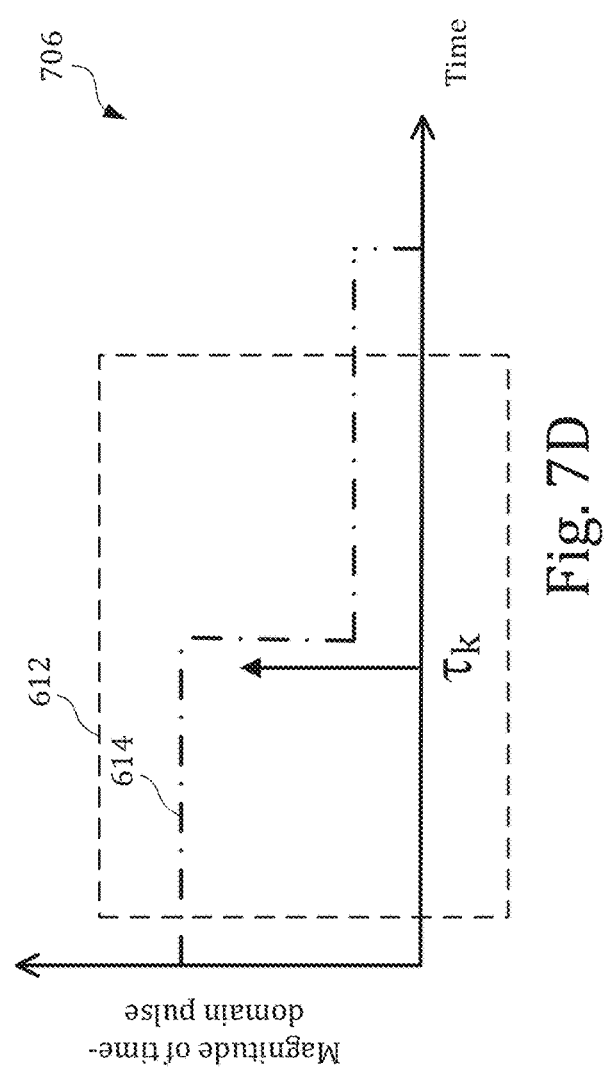
Figure 7E:
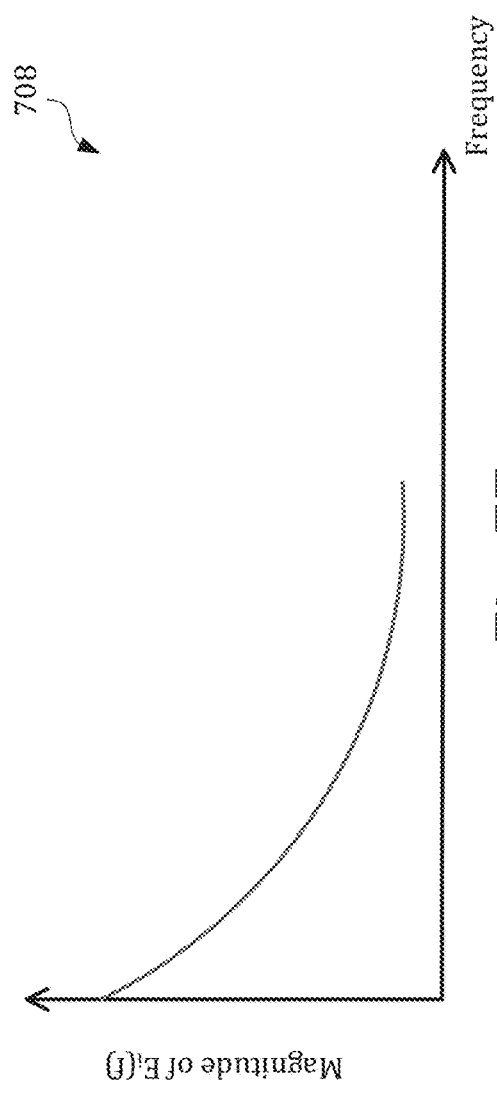
Figure 7F:
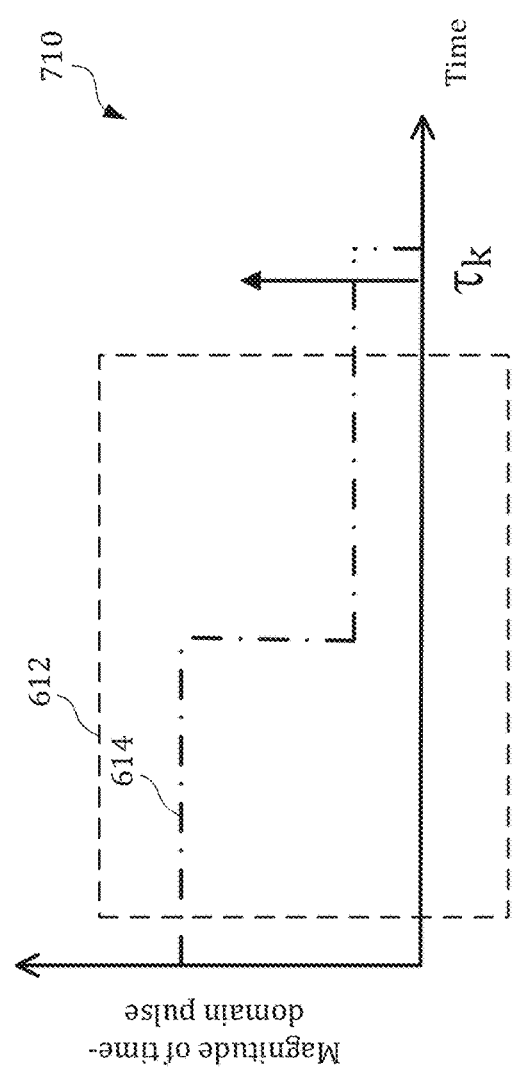

FIGS. 7A, 7C, and 7E are plots 700, 704, 708 showing example error signals $E_i(f)$, and FIGS. 7B, 7D, and 7F are plots 702, 706, 710 showing example time-domain pulses that correlate with the error signals $E_i(f)$ shown in FIGS. 7A, 7C, and 7E, respectively. The horizontal axes of the plots 700, 704, 708 shown in FIGS. 7A, 7C, and 7E represent frequency, and the vertical axes represent the magnitude of a real part or an imaginary part of the respective error signals $E_i(f)$. The horizontal axes of the plots 702, 706, 710 shown in FIGS. 7B, 7D, and 7F represent time, and the vertical axes represent the magnitude of the respective time-domain pulses. FIGS. 7A, 7B, 7C, 7D, 7E, and 7F illustrate the relationship between the time-domain and the frequency-domain (e.g., established by the Fourier transform), where a high pulse delay in the time-domain (e.g., as indicated by a large pulse time $\tau_k$) correlates with a complex exponential that decays rapidly in the frequency-domain, and where a low pulse delay in the time-domain (e.g., as indicated by a small pulse time $\tau_k$) correlates with a complex exponential that decays slowly in the frequency-domain. Similarly, in some implementations, a low pulse delay in the time-domain correlates with an error signal $E_i(f)$ that varies slowly across frequency, while a high pulse delay in the time-domain correlates with an error signal $E_i(f)$ that experiences large variation across frequency.

The one or more pulses that are estimated by the adaptive constrained solver 504 are checked to determine whether they satisfy the one or more constraints. When the estimated pulse(s) satisfy the one or more constraints, the estimated pulse(s) are inserted into the time-domain channel response from the first iteration to produce the updated time-domain channel response $\hat{h}_i(t)$. Conversely, when the estimated pulse(s) does not satisfy the one or more constraints, the estimated pulse(s) are not inserted into the time-domain channel response from the first iteration. In the examples of FIGS. 7A, 7B, 7C, 7D, 7E, and 7F, the time-domain pulses that correlate with their respective error signals $E_i(f)$ are compared against the time and amplitude constraints 612, 614. In these examples, the time-domain pulses from FIGS. 7B and 7D satisfy the constraints 612, 614, and can be inserted into time-domain channel response from the first iteration to produce the updated time-domain channel response $\hat{h}_i(t)$. The time-domain pulse from FIG. 7F, on the other hand, does not satisfy the constraints 612, 614, and is not inserted into the time-domain channel response from the first iteration.

Figure 6C:
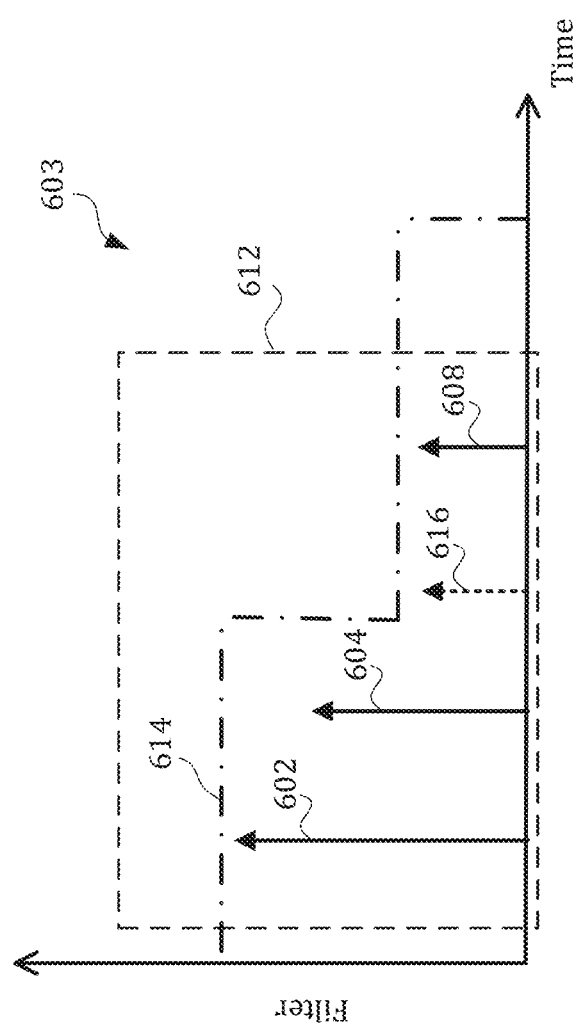
FIG. 6C is a plot showing an example updated time-domain channel response $\hat{h}_i(t)$ obtained in a second iteration of the example signal processing system shown in FIG. 5.

FIG. 6C is a plot 603 showing an example updated time-domain channel response $\hat{h}_i(t)$ obtained in a second iteration of the adaptive constrained solver 504 based on the filtered time-domain channel response from the first iteration, the error signal $E_i(f)$ from the first iteration, and the one or more constraints. The horizontal axis of the plot 603 represents time, and the vertical axis represents the value of the updated time-domain channel response $\hat{h}_i(t)$ from the second iteration. In the example of FIG. 6C, the updated time-domain channel response $\hat{h}_i(t)$ includes a pulse 616 that is inserted into the filtered time-domain channel response from the first iteration (e.g., shown in FIG. 6B), based on the error signal $E_i(f)$ from the first iteration and the constraints 612, 614.

The updated time-domain channel response $\hat{h}_i(t)$ is provided to the time-to-frequency converter block 506 to transform the updated time-domain channel response $\hat{h}_i(t)$ to its corresponding updated reconstructed frequency-domain channel response $\hat{H}_i(f)$. The error calculation block 508 accepts the observed frequency-domain channel response $H_i(f)$ and the updated reconstructed frequency-domain channel response $\hat{H}_i(f)$ as inputs, and generates the error signal $E_i(f)$ for the second iteration of the adaptive constrained solver 504. In some implementations, the error signal $E_i(f)$ for the second iteration is indicative of a difference between the observed frequency-domain channel response $H_i(f)$ and the updated reconstructed frequency-domain channel response $\hat{H}_i(f)$.

In some implementations, when the updated time-domain channel response $\hat{h}_i(t)$ provided to the decision block 510 is produced in a second or subsequent iteration of the adaptive constrained solver 504, the decision block 510 determines whether a further iteration of the adaptive constrained solver 504 is needed. In some instances, this determination is based on whether the error signal $E_i(f)$ from that iteration satisfies a criterion. For example, in some implementations, the decision block 510 may determine whether the power of the error signal $E_i(f)$ is less than a predetermined threshold (e.g., when the error signal $E_i(f)$ has decayed to more than 15 dB below the signal power, where the signal power is given as the root mean square of all the frequency bins in the channel). As another example, the decision block 510 may determine whether a difference between the power of the error signals $E_i(f)$ from the current iteration and a preceding iteration (e.g., immediately preceding iteration) is less than a predetermined threshold (e.g., the error signals differ by about 1% to about 5%). In some instances, the power of the error signal $E_i(f)$ can be determined by integrating the squared magnitude of the error signal $E_i(f)$ over the frequency bands used by a wireless communication system.

In response to a determination that the error signal $E_i(f)$ from a second or subsequent iteration does not satisfy the criterion, the adaptive constrained solver 504 executes another iteration. Specifically, the adaptive constrained solver 504 generates an updated time-domain channel response $\hat{h}_i(t)$ based on the filtered time-domain channel response from the previous iteration, the error signal $E_i(f)$ from the previous iteration, and the one or more constraints, as discussed above in the example of the adaptive constrained solver 504 executing a second iteration. In some instances, the adaptive constrained solver 504 repeats the generation of the updated time-domain channel response $\hat{h}_i(t)$, the updated reconstructed frequency-domain channel response $\hat{H}_i(f)$, and the error signal $E_i(f)$ until the error signal $E_i(f)$ satisfies the criterion.

In response to a determination that the error signal $E_i(f)$ from a second or subsequent iteration satisfies the criterion, the decision block 510 provides the most recent reconstructed frequency-domain channel response $\hat{H}_i(f)$, the most recent error signal $E_i(f)$, and the observed frequency-domain channel response $H_i(f)$ to a quality metric calculation block 512. In some implementations, the quality metric calculation block 512 generates a quality metric $\mu_i$ associated with the reconstructed frequency-domain channel response $\hat{H}_i(f)$ and the observed frequency-domain channel response $H_i(f)$. In some instances, the quality metric $\mu_i$ may be a measure of an extent to which the observed frequency-domain channel response $H_i(f)$ has been corrupted by impairments that are not related to changes in the physical environment. Therefore, the quality metric $\mu_i$ may be analogous to the SNR of the corresponding frequency-domain channel response $H_i(f)$. In some implementations, a high quality metric $\mu_i$ (e.g., when the quality metric $\mu_i$ is greater than a predetermined threshold) may indicate that the corresponding observed frequency-domain channel response $H_i(f)$ has been corrupted to a low degree by impairments that are not related to changes in the physical environment. Conversely, a low quality metric $\mu_i$ (e.g., when the quality metric $\mu_i$ is less than a predetermined threshold) may indicate that the corresponding observed frequency-domain channel response $H_i(f)$ has been corrupted to a high degree by impairments that are not related to changes in the physical environment.

In some implementations, the quality metric $\mu_i$ may be a ratio of a power of the observed frequency-domain channel response $H_i(f)$ to a power of the error signal $E_i(f)$. The power of the observed frequency-domain channel response $H_i(f)$ may be the total power of the observed frequency-domain channel response $H_i(f)$ integrated over all frequencies of interest (e.g., the frequency bands used by a wireless communication system). Similarly, the power of the error signal $E_i(f)$ may be the total power of the error signal $E(f)$ integrated over all frequencies of interest. The quality metric $\mu_i$ may be expressed in linear form, in decibels, or another appropriate representation.

The iterative operations performed by the system 500 on the observed frequency-domain channel response $H_i(f)$ minimizes the error between the reconstructed frequency-domain channel response $\hat{H}_i(f)$ and the observed frequency-domain channel response $H_i(f)$, while being constrained by the propagation environment in which the wireless communication system operates. In some implementations, the iterative constrained least squares optimization process performed by the system 500 may be expressed as:

$$\min_w \|A_F w - H_i\|^2 \quad (9)$$

In some implementations, the one or more constraints imposed by the adaptive constrained solver 504 may be reflected in the matrix $A_F$. For example, supposing the wireless communication system operates at frequencies $f_1$, $f_2, \ldots, f_M$, and the one or more constraints indicate that the propagation environment in which the wireless communication system operates can be modeled with a pulse at a pulse time $\tau_1$ having a coefficient $\alpha_1$, a pulse at a (later) pulse time $\tau_2$ having a coefficient $\alpha_2$, and so on until a pulse at a (later) pulse time $\tau_K$ having a coefficient $\alpha_K$. Then, in some instances, the matrix $A_F$ can be expressed as:

$$A_F = \begin{bmatrix} \alpha_1 e^{-j2\pi f_1 \tau_1} & \alpha_2 e^{-j2\pi f_1 \tau_2} & \cdots & \alpha_K e^{-j2\pi f_1 \tau_K} \\ \vdots & & \ddots & \vdots \\ \alpha_1 e^{-j2\pi f_M \tau_1} & \alpha_2 e^{-j2\pi f_M \tau_2} & \cdots & \alpha_K e^{-j2\pi f_M \tau_K} \end{bmatrix} \quad (9)$$

The constrained least squares solution to Equations (8) and (9) can, in some instances, be expressed as:

$$w_{opt} = (A_F^T A_F)^{-1} A_F^T H_i \quad (10)$$

where the matrix $A_F^T$ is the transpose of the matrix $A_F$. The optimal reconstructed frequency-domain channel response $\hat{H}_i(f)$ is then given by $\hat{H}_i(f) = A_F w_{opt}$, as an example.

The operations of the system 500 are performed for each frequency-domain channel response from the set of observed frequency-domain channel responses $\{H_1(f), H_2(f), \ldots, H_n(f)\}$, thus generating the set of reconstructed frequency-domain channel responses $\{\hat{H}_1(f), \hat{H}_2(f), \ldots, \hat{H}_n(f)\}$ and the set of quality metrics $\{\mu_1, \mu_2, \ldots, \mu_n\}$. In some implementations, the set of observed frequency-domain channel responses $\{H_1(f), H_2(f), \ldots, H_n(f)\}$, the set of reconstructed frequency-domain channel responses $\{\hat{H}_1(f), \hat{H}_2(f), \ldots, \hat{H}_n(f)\}$, and the set of quality metrics $\{\mu_1, \mu_2, \ldots, \mu_n\}$ are provided to a motion detection engine 514 that detects motion based on the set of observed frequency-domain channel responses $\{H_1(f), H_2(f), \ldots, H_n(f)\}$.

For example, the motion detection engine 514 may detect motion using the set of reconstructed frequency-domain channel responses $\{\hat{H}_1(f), \hat{H}_2(f), \ldots, \hat{H}_n(f)\}$. In some implementations, the motion detection engine 512 may detect motion of an object in a space by analyzing changes in the set of reconstructed frequency-domain channel responses $\{\hat{H}_1(f), \hat{H}_2(f), \ldots, \hat{H}_n(f)\}$. Since the effects of device- or system-level electronic impairments on the observed frequency-domain channel responses $\{H_1(f), H_2(f), \ldots, H_n(f)\}$ have been filtered out, thus yielding the set of reconstructed frequency-domain channel responses $\{\hat{H}_1(f), \hat{H}_2(f), \ldots, \hat{H}_n(f)\}$, motion detection that is based on the set of reconstructed frequency-domain channel responses $\{\hat{H}_1(f), \hat{H}_2(f), \ldots, \hat{H}_n(f)\}$ more accurately represents changes (e.g., motion) in the physical environment, thus reducing the false positive rate of a motion detection system.

As another example, the motion detection engine 514 may detect motion using the set of observed frequency-domain channel responses $\{H_1(f), H_2(f), \ldots, H_n(f)\}$ and the set of quality metrics $\{\mu_1, \mu_2, \ldots, \mu_n\}$. In some implementations, the motion detection engine 514 may detect motion using the set of observed frequency-domain channel responses $\{H_1(f), H_2(f), \ldots, H_n(f)\}$ when the set of quality metrics $\{\mu_1, \mu_2, \ldots, \mu_n\}$ indicates that the set of observed frequency-domain channel responses $\{H_1(f), H_2(f), \ldots, H_n(f)\}$ has been corrupted to a low degree by impairments that are not related to changes in the physical environment. In some instances, the motion detection system can reject the set of observed frequency-domain channel responses $\{H_1(f), H_2(f), \ldots, H_n(f)\}$ when at least one of the quality metrics $\{\mu_1, \mu_2, \ldots, \mu_n\}$ indicates that the set of observed frequency-domain channel responses $\{H_1(f), H_2(f), \ldots, H_n(f)\}$ has been corrupted to a high degree by impairments that are not related to changes in the physical environment (e.g., when at least one quality metric is below a predetermined threshold, which may be in a range from about 10 dB to about 15 dB). Consequently, the corrupted set of observed frequency-domain channel responses $\{H_1(f), H_2(f), \ldots, H_n(f)\}$ is precluded from being used in a motion detection system. In such instances, the system 500 may process a subsequently received set of frequency-domain channel responses, and the motion detection engine 514 may detect motion based on the subsequently received set of frequency-domain channel responses. Consequently, motion detection that is based on the set of observed frequency-domain channel responses $\{H_1(f), H_2(f), \ldots, H_n(f)\}$ when each quality metric $\mu_i$ in the set of quality metrics $\{\mu_1, \mu_2, \ldots, \mu_n\}$ is above a predetermined threshold (e.g., which may be in a range from about 10 dB to about 15 dB) can more accurately represent changes (e.g., motion) in the physical environment, thus reducing the false positive rate of a motion detection system.

Figure 8:
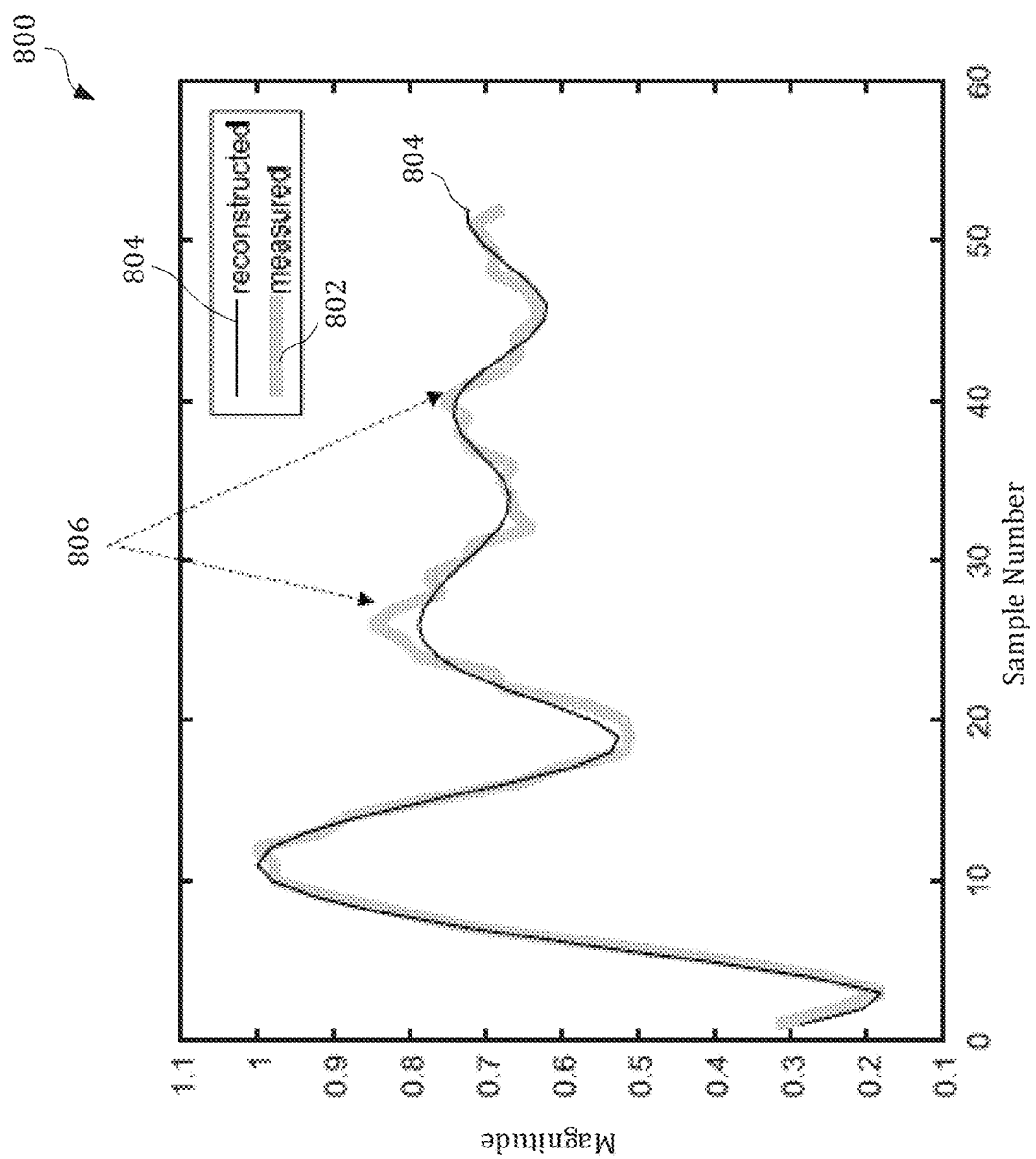
FIG. 8 is a plot showing an example observed frequency-domain channel response $H_i(f)$ and an example reconstructed frequency-domain channel response $\hat{H}_i(f)$ obtained using the example signal processing system shown in FIG. 5.

FIG. 8 is a plot 800 showing an example observed frequency-domain channel response $H_i(f)$ 802 and an example reconstructed frequency-domain channel response $\hat{H}_i(f)$ 804 obtained using the example signal processing system 500 shown in FIG. 5. The horizontal axis of the plot 800 shown in FIG. 8 represents frequency (expressed as sample number), and the vertical axis represents the magnitude of an observed frequency-domain channel response $H_i(f)$ 802 and the magnitude of an example reconstructed frequency-domain channel response $\hat{H}_i(f)$ 804. As shown in FIG. 8, the reconstructed frequency-domain channel response $\hat{H}_i(f)$ 804 is smoother than the observed frequency-domain channel response $H_i(f)$ 802. The high frequency noise components 806 are unlikely to be representative of the propagation environment since the high frequency noise components 806 may be caused by pulses that are too far away and too attenuated to be part of the propagation environment in which the wireless communication system operates. Consequently, the system 500 filters the high frequency noise components 806 based on the premise that the high frequency noise components 806 are caused, at least in part, by impairments (e.g., noise or distortions) that may not be related to changes in the physical environment. After optimization with one or more constraints, the reconstructed frequency-domain channel response $\hat{H}_i(f)$ 804 that is obtained is smoother compared to the observed frequency-domain channel response $H_i(f)$ 802, which may reflect a smaller number of multi-paths available for forming the frequency- or time-domain channel response.

Figure 9:
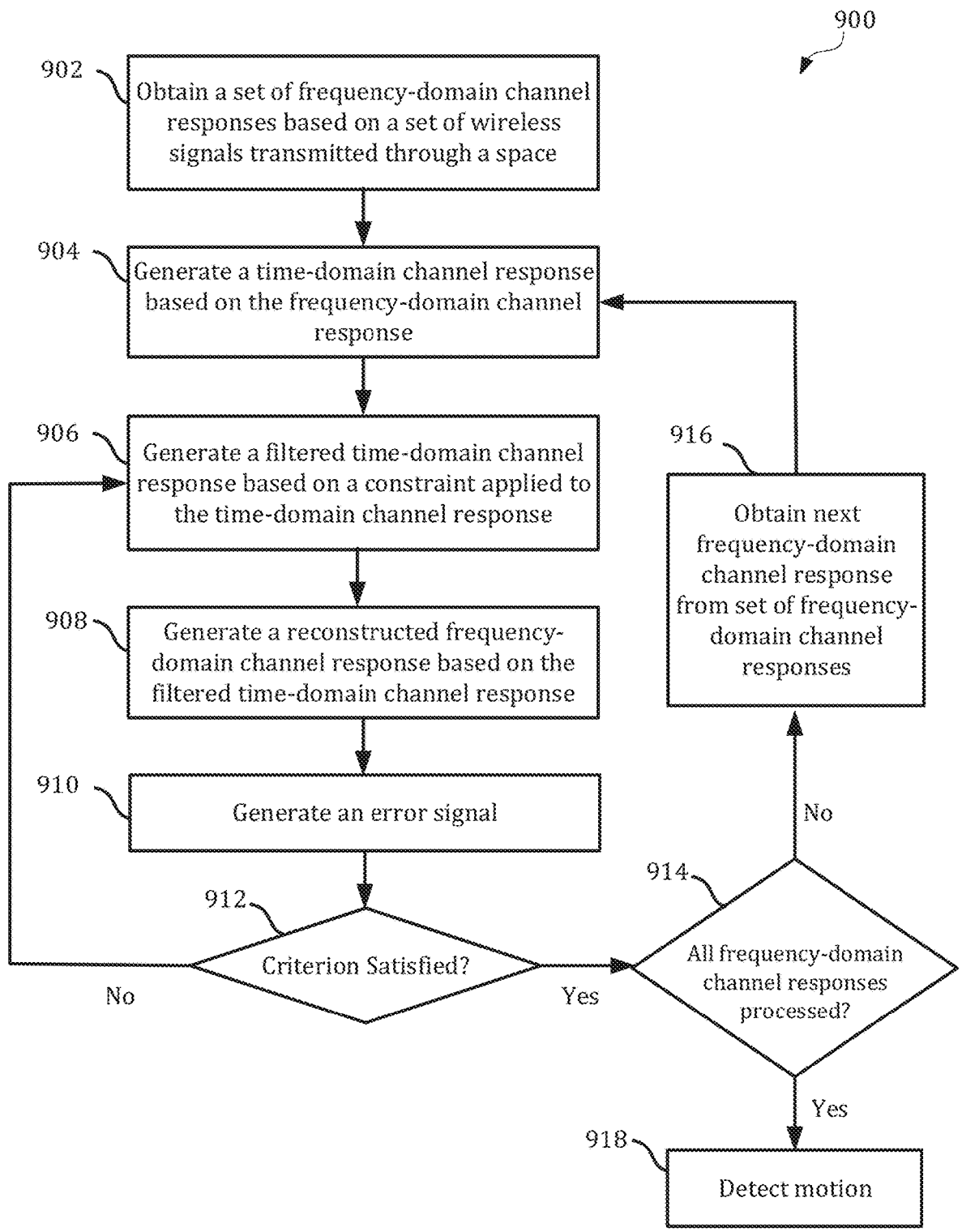
FIG. 9 is a flowchart showing an example process for filtering channel responses for motion detection.

FIG. 9 is a flowchart showing an example process 900 for filtering channel responses for motion detection. The example process 900 can be performed, for example, by a motion detection system to process each frequency-domain channel response $H_i(f)$ from the set of observed frequency-domain channel responses $\{H_1(f), H_2(f), \ldots, H_n(f)\}$ to filter out noise or distortions that are not related to changes in the physical environment. The motion detection system can process information based on wireless signals transmitted (e.g., on wireless links between wireless communication devices) through a space to detect motion of objects in the space (e.g., as described with respect to FIGS. 1, 2A, 2B, 2C, 3 or otherwise). Operations of the process 900 may be performed by a remote computer system (e.g., a server in the cloud), a wireless communication device (e.g., one or more of the wireless communication devices), or another type of system. For example, operations in the example process 900 may be performed by the example wireless communication devices 102A, 102B, 102C shown in FIG. 1, by the example wireless communication devices 204A, 204B, 204C shown in FIGS. 2A and 2B, by any of the example devices (e.g., client devices 232) shown in FIG. 2C, or by another type of device.

The example process 900 may include additional or different operations, and the operations may be performed in the order shown or in another order. In some cases, one or more of the operations shown in FIG. 9 can be implemented as processes that include multiple operations, sub-processes, or other types of routines. In some cases, operations can be combined, performed in another order, performed in parallel, iterated, or otherwise repeated or performed in another manner.

At 902, a set of observed frequency-domain channel responses $\{H_1(f), H_2(f), \ldots, H_n(f)\}$ is obtained based on a set of wireless signals transmitted through a space (e.g. the propagation environment shown in FIGS. 1, 2A, 2B, 2C, 3, or other types of spaces). In some instances, each frequency-domain channel response $H_i(f)$ from the set of observed frequency-domain channel responses corresponds to a respective wireless signal from the set of wireless signals.

In some implementations, each frequency-domain channel response $H_i(f)$ from the set of observed frequency-domain channel responses $\{H_1(f), H_2(f), \ldots, H_n(f)\}$ is processed using operations 904, 906, 908, 910, 912. Specifically, at 904, a time-domain channel response $h_i(t)$ is generated based on the frequency-domain channel response $H_i(f)$. In some instances, the time-domain channel response $h_i(t)$ is generated using a frequency-to-time converter (e.g., the frequency-to-time converter 502 shown in the example of FIG. 5) that converts a signal from the frequency-domain to the time-domain.

At 906, a filtered time-domain channel response $\hat{h}_i(t)$ is generated based on a constraint applied to the time-domain channel response $h_i(t)$. In some implementations, a constrained least squares optimization process may be used to generate the filtered time-domain channel response $\hat{h}_i(t)$. The constrained least squares optimization process can, in some instances, be executed by a constrained solver (e.g., the constrained solver 504 shown in the example of FIG. 5). The constraint applied to the time-domain channel response $h_i(t)$ may be representative of the propagation environment in which the wireless communication system operates. For example, the constraint may be a constraint on a time duration (e.g., the total time duration) of the time-domain channel response $h_i(t)$, as illustrated in the examples shown in FIGS. 6A, 6B, 6C, 7A, 7B, 7C, 7D, 7E, and 7F. Additionally or alternatively, the constraint may be a constraint on an amplitude or magnitude (e.g., as a function of time) of the time-domain channel response $h_i(t)$, also as illustrated in the examples shown in FIGS. 6A, 6B, 6C, 7A, 7B, 7C, 7D, 7E, and 7F.

At 908, a reconstructed frequency-domain channel response $\hat{H}_i(f)$ is generated based on the filtered time-domain channel response $\hat{h}_i(t)$. In some implementations, the reconstructed frequency-domain channel response $\hat{H}_i(f)$ is generated using a time-to-frequency converter (e.g., the time-to-frequency converter 506 shown in the example of FIG. 5) that converts a signal from the time-domain to the frequency-domain.

At 910, an error signal $E_i(f)$ is generated. The error signal $E_i(f)$ may be indicative of a difference between the observed frequency-domain channel response $H_i(f)$ and the reconstructed frequency-domain channel response $\hat{H}_i(f)$. In some instances, such as in the example of FIG. 5, the error signal $E_i(f)$ may be generated by subtracting the observed frequency-domain channel response $H_i(f)$ from the reconstructed frequency-domain channel response $\hat{H}_i(f)$, or vice versa.

At 912, a determination is made as to whether the error signal $E_i(f)$ satisfies a criterion. As an example, the power of the error signal $E_i(f)$ can be determined, and operation 912 may determine whether the power of the error signal $E_i(f)$ is less than a predetermined threshold (e.g., which may be in a range from about 10 dB to about 15 dB below the signal power. where the signal power is the root mean square power of all the frequency bins). As another example, the operation 912 may determine whether a difference between the power of the error signals $E_i(f)$ from the current iteration of the constrained least squares optimization process and a preceding iteration (e.g., immediately preceding iteration) of the constrained least squares optimization process is less than a predetermined threshold (e.g., the error signals differ by about 1% to about 5%). In some implementations, operation 912 may be performed by a decision block (e.g., the decision block 510 shown in FIG. 5).

In response to a determination that the respective error signals $E_i(f)$ do not satisfy the criterion, operations 906, 908, 910 are iterated. Specifically, in a subsequent iteration of operations 906, 908, 910, an updated time-domain channel response $\hat{h}_i(t)$ is generated based on the filtered time-domain channel response from the preceding iteration, the error signal $E_i(f)$ from the preceding iteration, and the constraint. An updated reconstructed frequency-domain channel response $\hat{H}_i(f)$ is then generated based on the updated time-domain channel response $\hat{h}_i(t)$, and the error signal $E_i(f)$ for the current iteration is generated based on a difference between the updated reconstructed frequency-domain channel response $\hat{H}_i(f)$ and the observed frequency-domain channel response $H_i(f)$.

In response to a determination that the respective error signals $E_i(f)$ do not satisfy the criterion, a determination is made (e.g., at 914) as to whether all frequency-domain channel responses from the set of observed frequency-domain channel responses $\{H_1(f), H_2(f), \ldots, H_n(f)\}$ have been processed to filter out noise or distortions that are not related to changes in the physical environment. In response to a determination that all frequency-domain channel responses from the set of observed frequency-domain channel responses $\{H_1(f), H_2(f), \ldots, H_n(f)\}$ have not been processed, the next frequency-domain channel response $H_{i+1}(f)$ from the set of observed frequency-domain channel responses $\{H_1(f), H_2(f), \ldots, H_n(f)\}$ is obtained (at 916), and process 900 is performed on the next frequency-domain channel response $H_{i+1}(f)$ starting at 904. In response to a determination that all frequency-domain channel responses from the set of observed frequency-domain channel responses $\{H_1(f), H_2(f), \ldots, H_n(f)\}$ have been processed, motion is detected (at 918) based on the set of observed frequency-domain channel responses $\{H_1(f), H_2(f), \ldots, H_n(f)\}$.

In an example of operation 918, motion may be detected using the set of reconstructed frequency-domain channel responses $\{\hat{H}_1(f), \hat{H}_2(f), \ldots, \hat{H}_n(f)\}$. In some implementations, motion of an object in a space may be detected by analyzing changes in the set of reconstructed frequency-domain channel responses $\{\hat{H}_1(f), \hat{H}_2(f), \ldots, \hat{H}_n(f)\}$. Since the effects of device- or system-level electronic impairments on the observed frequency-domain channel responses $\{H_1(f), H_2(f), \ldots, H_n(f)\}$ have been filtered out, thus yielding the set of reconstructed frequency-domain channel responses $\{\hat{H}_1(f), \hat{H}_2(f), \ldots, \hat{H}_n(f)\}$, motion detection that is based on the set of reconstructed frequency-domain channel responses $\{\hat{H}_1(f), \hat{H}_2(f), \ldots, \hat{H}_n(f)\}$ more accurately represents changes (e.g., motion) in the physical environment, thus reducing the false positive rate of a motion detection system.

In another example of operation 918, motion may be detected using the set of observed frequency-domain channel responses $\{H_1(f), H_2(f), \ldots, H_n(f)\}$ and a set of quality metrics $\{\mu_1, \mu_2, \ldots, \mu_n\}$. In some implementations, a respective quality metric $\mu_i$ may be a ratio of a power of the respective observed frequency-domain channel response $H_i(f)$ to a power of the respective error signal $E_i(f)$. In some instances, the quality metric $\mu_i$ may be a measure of an extent to which the observed frequency-domain channel response $H_i(f)$ has been corrupted by impairments that are not related to changes in the physical environment. In some implementations, the motion detection engine 514 may detect motion using the set of observed frequency-domain channel responses $\{H_1(f), H_2(f), \ldots, H_n(f)\}$ when each quality metric in the set of quality metrics $\{\mu_1, \mu_2, \ldots, \mu_n\}$ is above a predetermined threshold (which may be in a range from about 10 dB to about 15 dB). In some implementations, when at least one quality metric in the set of quality metrics $\{\mu_1, \mu_2, \ldots, \mu_n\}$ is below a predetermined threshold (which may be in a range from about 10 dB to about 15 dB), the set of observed frequency-domain channel responses $\{H_1(f), H_2(f), \ldots, H_n(f)\}$ can be discarded, and the motion detection system may detect motion based on the subsequently received set of frequency-domain channel responses. Consequently, motion detection that is based on the set of observed frequency-domain channel responses $\{H_1(f), H_2(f), \ldots, H_n(f)\}$ when each quality metric $\mu_i$ in the set of quality metrics $\{\mu_1, \mu_2, \ldots, \mu_n\}$ is above the predetermined threshold more accurately represents changes (e.g., motion) in the physical environment, thus reducing the false positive rate of a motion detection system.

Figure 10:
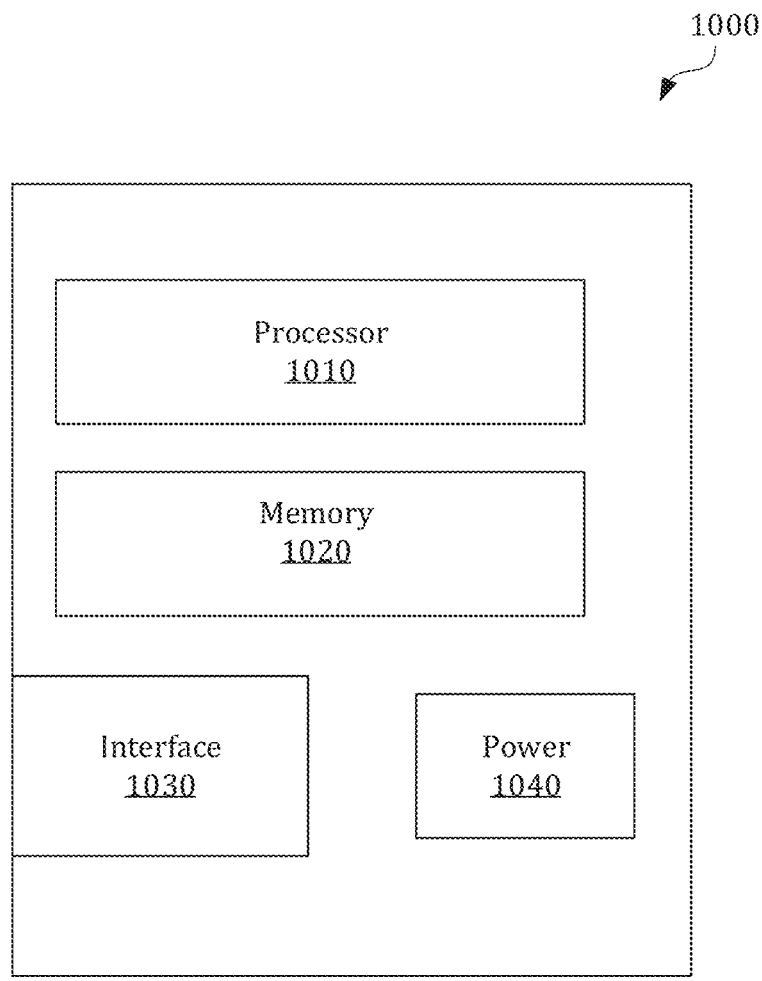
FIG. 10 is a block diagram showing an example wireless communication device.

FIG. 10 is a block diagram showing an example wireless communication device 1000. The example wireless communication device 1000 may be the example wireless communication devices 102A, 102B, 102C shown in FIG. 1, the example wireless communication devices 204A, 204B, 204C shown in FIGS. 2A and 2B, any of the example devices (e.g., client devices 232) shown in FIG. 2C, or another type of wireless communication device. As shown in FIG. 10, the example wireless communication device 1000 includes an interface 1030, a processor 1010, a memory 1020, and a power unit 1040. A wireless communication device (e.g., any of the wireless communication devices 102A, 102B, 102C in FIG. 1) can include additional or different components, and the wireless communication device 1000 may be configured to operate as described with respect to the examples above. In some implementations, the interface 1030, processor 1010, memory 1020, and power unit 1040 of a wireless communication device are housed together in a common housing or other assembly. In some implementations, one or more of the components of a wireless communication device can be housed separately, for example, in a separate housing or other assembly.

The example interface 1030 can communicate (receive, transmit, or both) wireless signals. For example, the interface 1030 may be configured to communicate radio frequency (RF) signals formatted according to a wireless communication standard (e.g., Wi-Fi, 4G, 5G, Bluetooth, etc.). In some implementations, the example interface 1030 includes a radio subsystem and a baseband subsystem. The radio subsystem may include, for example, one or more antennas and radio frequency circuitry. The radio subsystem can be configured to communicate radio frequency wireless signals on the wireless communication channels. As an example, the radio subsystem may include a radio chip, an RF front end, and one or more antennas. The baseband subsystem may include, for example, digital electronics configured to process digital baseband data. In some cases, the baseband subsystem may include a digital signal processor (DSP) device or another type of processor device. In some cases, the baseband system includes digital processing logic to operate the radio subsystem, to communicate wireless network traffic through the radio subsystem or to perform other types of processes.

The example processor 1010 can execute instructions, for example, to generate output data based on data inputs. The instructions can include programs, codes, scripts, modules, or other types of data stored in memory 1020. Additionally or alternatively, the instructions can be encoded as pre-programmed or re-programmable logic circuits, logic gates, or other types of hardware or firmware components or modules. The processor 1010 may be or include a general-purpose microprocessor, as a specialized co-processor or another type of data processing apparatus. In some cases, the processor 1010 performs high level operation of the wireless communication device 1000. For example, the processor 1010 may be configured to execute or interpret software, scripts, programs, functions, executables, or other instructions stored in the memory 1020. In some implementations, the processor 1010 may be included in the interface 1030 or another component of the wireless communication device 1000.

The example memory 1020 may include computer-readable storage media, for example, a volatile memory device, a non-volatile memory device, or both. The memory 1020 may include one or more read-only memory devices, random-access memory devices, buffer memory devices, or a combination of these and other types of memory devices. In some instances, one or more components of the memory can be integrated or otherwise associated with another component of the wireless communication device 1000. The memory 1020 may store instructions that are executable by the processor 1010. For example, the instructions may include instructions to perform one or more of the operations in the example process 900 shown in FIG. 9.

The example power unit 1040 provides power to the other components of the wireless communication device 1000. For example, the other components may operate based on electrical power provided by the power unit 1040 through a voltage bus or other connection. In some implementations, the power unit 1040 includes a battery or a battery system, for example, a rechargeable battery. In some implementations, the power unit 1040 includes an adapter (e.g., an AC adapter) that receives an external power signal (from an external source) and coverts the external power signal to an internal power signal conditioned for a component of the wireless communication device 1000. The power unit 1020 may include other components or operate in another manner.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

In a general aspect, channel responses are filtered for motion detection.

In a first example, a method includes obtaining a set of frequency-domain channel responses based on a set of wireless signals transmitted through a space. Each of the frequency-domain channel responses may correspond to a respective wireless signal of the set of wireless signals. The method generates, for each frequency-domain channel response: a time-domain channel response based on the frequency-domain channel response; a filtered time-domain channel response based on a constraint applied to the time-domain channel response; a reconstructed frequency-domain channel response based on the filtered time-domain channel response; and an error signal indicative of a difference between the frequency-domain channel response and the reconstructed frequency-domain channel response. The method also includes determining whether the error signal satisfies a criterion. In response to each of the error signals satisfying the criterion, the method detects motion of an object in the space based on the set of frequency-domain channel responses.

Implementations of the first example may include one or more of the following features. For at least one of the frequency-domain channel responses and in response to the error signal not satisfying the criterion, the method includes: generating an updated time-domain channel response based on the filtered time-domain channel response, the error signal, and the constraint; generating an updated reconstructed frequency-domain channel response based on the updated time-domain channel response; regenerating the error signal based on a difference between the frequency-domain channel response and the updated reconstructed frequency-domain channel response; and repeating generation of the updated time-domain channel response, the updated reconstructed frequency-domain channel response, and the error signal until the error signal satisfies the criterion. The constraint may include a constraint on a time duration of the time-domain channel response. The constraint may include a constraint on amplitudes of the time-domain channel response. In some implementations, detecting, in response to each of the error signals satisfying the criterion, the motion of the object in the space based on the set of frequency-domain channel responses includes detecting the motion based on the reconstructed frequency-domain channel responses. In some implementations, detecting, in response to each of the error signals satisfying the criterion, the motion of the object in the space based on the set of frequency-domain channel responses includes detecting the motion of the object based on the set of frequency-domain channel responses and a set of quality metrics. Each of the frequency-domain channel responses may correspond to a respective quality metric of the set of quality metrics. In some implementations, the method includes determining, for each frequency-domain channel response, the corresponding quality metric based on the error signal. In some implementations, the corresponding quality metric includes a ratio of a power of the frequency-domain channel response to a power of the error signal. The set of wireless signals can include, or be, a set of orthogonal frequency division multiplexing (OFDM) signals, and each of the frequency-domain channel responses may be based on one or more training fields in a PHY frame of a corresponding OFDM signal of the set of OFDM signals. The set of wireless signals may be formatted according to a wireless communication standard.

In a second example, a non-transitory computer-readable medium stores instructions that are operable when executed by data processing apparatus to perform one or more operations of the first example. In a third example, a system includes a plurality of wireless communication devices and a computer device configured to perform one or more operations of the first example.

Implementations of the third example may include one or more of the following features. One of the wireless communication devices can be or include the computer device. The computer device can be located remote from the wireless communication devices.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:
   obtaining a frequency-domain channel response based on a wireless signal transmitted through a space, the wireless signal being formatted according to a wireless communication standard;
   generating a time-domain channel response based on the frequency-domain channel response;
   generating a filtered time-domain channel response based on a constraint applied to the time-domain channel response, wherein the constraint is indicative of a maximum delay with which a pulse can reach a receiving wireless communication device, the constraint being determined by a maximum attenuation the pulse can experience in the space and be received by the receiving wireless communication device;
   generating a reconstructed frequency-domain channel response based on the filtered time-domain channel response; and
   determining a state of the space based on the reconstructed frequency-domain channel responses.

2. The method of claim 1, wherein the time-domain channel response comprises a plurality of time domain pulses with each time domain pulse comprising an amplitude coefficient and a pulse time.

3. The method of claim 2, wherein the constraint comprises a constraint on the pulse time of each of the plurality of time domain pulses in the time-domain channel response.

4. The method of claim 2, wherein the constraint comprises a constraint on the amplitude coefficient of each of the plurality of time domain pulses in the time-domain channel response.

5. The method of claim 1, wherein the wireless signal comprises an orthogonal frequency division multiplexing (OFDM) signal, and the frequency-domain channel response is based on one or more training fields in a PHY frame of the OFDM signal.

6. A device comprising:
   one or more processors;
   memory storing instructions that are operable when executed by the one or more processors to perform operations comprising:
      obtaining a frequency-domain channel response based on a wireless signal transmitted through a space, the wireless signal being formatted according to a wireless communication standard;
      generating a time-domain channel response based on the frequency-domain channel response;
      generating a filtered time-domain channel response based on a constraint applied to the time-domain channel response, wherein the constraint is indicative of a maximum delay with which a pulse can reach a receiving wireless communication device, the constraint being determined by a maximum attenuation the pulse can experience in the space and be received by the receiving wireless communication device;

generating a reconstructed frequency-domain channel response based on the filtered time-domain channel response; and determining a state of the space based on the reconstructed frequency-domain channel responses.

7. The device of claim 6, wherein the time-domain channel response comprises a plurality of time domain pulses with each time domain pulse comprising an amplitude coefficient and a pulse time.

8. The device of claim 7, wherein the constraint comprises a constraint on the pulse time of each of the plurality of time domain pulses in the time-domain channel response.

9. The device of claim 7, wherein the constraint comprises a constraint on the amplitude coefficient of each of the plurality of time domain pulses in the time-domain channel response.

10. The device of claim 6, wherein the wireless signal comprises an orthogonal frequency division multiplexing (OFDM) signal, and the frequency-domain channel response is based on one or more training fields in a PHY frame of the OFDM signal.

11. A method comprising:
obtaining a set of frequency-domain channel responses based on a set of wireless signals transmitted through a space, each of the frequency-domain channel responses corresponding to a respective wireless signal of the set of wireless signals, the set of wireless signals being formatted according to a wireless communication standard;

generating a set of time-domain channel responses based on the set of frequency-domain channel responses;

generating a set of filtered time-domain channel responses based on a constraint applied to each time-domain channel response of the set of time-domain channel responses, wherein the constraint is indicative of a maximum delay with which a pulse can reach a receiving wireless communication device, the constraint being determined by a maximum attenuation the pulse can experience in the space and be received by the receiving wireless communication device;

generating a set of reconstructed frequency-domain channel responses based on the set of filtered time-domain channel responses; and detecting motion of an object in the space based on the set of reconstructed frequency-domain channel responses.

12. The method of claim 11, wherein each of the time-domain channel responses comprises a plurality of time domain pulses with each time domain pulse comprising an amplitude coefficient and a pulse time.

13. The method of claim 12, wherein the constraint comprises a constraint on the pulse time of each of the plurality of time domain pulses in each of the time-domain channel responses.

14. The method of claim 12, wherein the constraint comprises a constraint on the amplitude coefficient of each of the plurality of time domain pulses in each of the time-domain channel responses.

15. The method of claim 11, wherein the set of wireless signals comprises a set of orthogonal frequency division multiplexing (OFDM) signals, and each of the frequency-domain channel responses is based on one or more training fields in a PHY frame of a corresponding OFDM signal of the set of OFDM signals.

16. A device comprising:
one or more processors;
memory storing instructions that are operable when executed by the one or more processors to perform operations comprising:
obtaining a set of frequency-domain channel responses based on a set of wireless signals transmitted through a space, each of the frequency-domain channel responses corresponding to a respective wireless signal of the set of wireless signals, the set of wireless signals being formatted according to a wireless communication standard;

generating a set of time-domain channel responses based on the set of frequency-domain channel responses;

generating a set of filtered time-domain channel responses based on a constraint applied to each time-domain channel response of the set of time-domain channel responses, wherein the constraint is indicative of a maximum delay with which a pulse can reach a receiving wireless communication device, the constraint being determined by a maximum attenuation the pulse can experience in the space and be received by the receiving wireless communication device;

generating a set of reconstructed frequency-domain channel responses based on the set of filtered time-domain channel responses; and detecting motion of an object in the space based on the set of reconstructed frequency-domain channel responses.

17. The device of claim 16, wherein each of the time-domain channel responses comprises a plurality of time domain pulses with each time domain pulse comprising an amplitude coefficient and a pulse time.

18. The device of claim 17, wherein the constraint comprises a constraint on the pulse time of each of the plurality of time domain pulses in the each of the time-domain channel responses.

19. The device of claim 17, wherein the constraint comprises a constraint on the amplitude coefficient of each of the plurality of time domain pulses in each of the time-domain channel responses.

20. The device of claim 16, wherein the set of wireless signals comprises a set of orthogonal frequency division multiplexing (OFDM) signals, and each of the frequency-domain channel responses is based on one or more training fields in a PHY frame of a corresponding OFDM signal of the set of OFDM signals.

* * * * *

UNITED STATES PATENT AND TRADEMARK OFFICE
CERTIFICATE OF CORRECTION

PATENT NO. : 11,962,437 B2
APPLICATION NO. : 17/379647
DATED : April 16, 2024
INVENTOR(S) : Omer et al.

Page 1 of 2

It is certified that error appears in the above-identified patent and that said Letters Patent is hereby corrected as shown below:

In the Specification

Column 11, Detailed Description, Line 50 Delete "$r_k$ (t)" and insert -- $r_k(t)$ -- therefor Column 12, Detailed Description, Line 26 Delete "KJ" and insert -- $Y_n$) -- therefor Column 15, Detailed Description, Line 6 Delete "$H_2$ (f)," and insert -- $H_2(f)$, -- therefor Column 15, Detailed Description, Line 12 Delete "$H_2$ (f)," and insert -- $H_2(f)$, -- therefor Column 15, Detailed Description, Line 49 Delete "$H_2$ (f)," and insert -- $H_2(f)$, -- therefor Column 15, Detailed Description, Line 63 Delete "$H_2$ (f)," and insert -- $H_2(f)$, -- therefor Column 16, Detailed Description, Line 2 Delete "$\hat{H}_2$ (f)," and insert -- $\hat{H}_2(f)$, -- therefor Column 16, Detailed Description, Line 20 Delete "$H_2$ (f)," and insert -- $H_2(f)$, -- therefor Column 21, Detailed Description, Line 67 Delete "$H_2$ (f)," and insert -- $H_2(f)$, -- therefor Column 22, Detailed Description, Line 5 Delete "$H_2$ (f)," and insert -- $H_2(f)$, -- therefor Column 22, Detailed Description, Line 8 Delete "{$\hat{H}_i(f)$." and insert -- {$\hat{H}_1(f)$, -- therefor Column 22, Detailed Description, Line 12 Delete "{$\hat{H}_i(f)$," and insert -- {$\hat{H}_1(f)$, -- therefor Column 22, Detailed Description, Line 30 Delete "$H_2$ (f)," and insert -- $H_2(f)$, -- therefor Signed and Sealed this
Thirteenth Day of August, 2024

Katherine Kelly Vidal
*Director of the United States Patent and Trademark Office*

CERTIFICATE OF CORRECTION (continued)
U.S. Pat. No. 11,962,437 B2

Column 22, Detailed Description, Line 51 Delete "$H_2$ (f)," and insert -- $H_2(f)$, -- therefor Column 25, Detailed Description, Line 9 Delete "$H_2$ (f)," and insert -- $H_2(f)$, -- therefor Column 25, Detailed Description, Line 17 Delete "$H_2$ (f)," and insert -- $H_2(f)$, -- therefor Column 25, Detailed Description, Line 55 Delete "$H_2$ (f)," and insert -- $H_2(f)$, -- therefor Columns 25-26, Detailed Description, Line 67 and Line 1 Delete "$H_2$ (f)," and insert -- $H_2(f)$, -- therefor